(12) United States Patent
Unagami et al.

(10) Patent No.: US 10,104,076 B2
(45) Date of Patent: Oct. 16, 2018

(54) AUTHENTICATION METHOD AND AUTHENTICATION SYSTEM

(71) Applicant: Panasonic Intellectual Property Corporation of America, Torrance, CA (US)

(72) Inventors: Yuji Unagami, Osaka (JP); Manabu Maeda, Osaka (JP); Hideki Matsushima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 159 days.

(21) Appl. No.: 15/012,913

(22) Filed: Feb. 2, 2016

(65) Prior Publication Data

US 2016/0149908 A1    May 26, 2016

Related U.S. Application Data

(63) Continuation of application No. PCT/JP2014/006154, filed on Dec. 10, 2014.

(Continued)

(30) Foreign Application Priority Data

Sep. 19, 2014 (JP) .................. 2014-191120

(51) Int. Cl.
*H04L 9/00* (2006.01)
*H04L 29/06* (2006.01)
(Continued)

(52) U.S. Cl.
CPC .......... *H04L 63/0869* (2013.01); *H04L 9/006* (2013.01); *H04L 9/0833* (2013.01);
(Continued)

(58) Field of Classification Search
CPC ..................................................... H04L 63/061
See application file for complete search history.

(56) References Cited

U.S. PATENT DOCUMENTS

2007/0116292 A1\* 5/2007 Kurita .................. H04L 9/0844
380/270
2013/0142336 A1   6/2013 Fries et al.

FOREIGN PATENT DOCUMENTS

WO    2011/141040 A1    11/2011

OTHER PUBLICATIONS

International Search Report of PCT application No. PCT/JP2014/006154 dated Mar. 10, 2015.

(Continued)

*Primary Examiner* — Josnel Jeudy
(74) *Attorney, Agent, or Firm* — Greenblum & Bernstein, P.L.C.

(57) ABSTRACT

A system performs mutual authentication between a controller and a first device, creates a group key, shares the group key, and sets the first device as a reference device. The system performs mutual authentication between the controller and a second device, and shares the group key with the second device. Thereafter, the system, performs mutual authentication between the controller and the first device, updates the group key, and shares the updated group key between the controller and the first device. At a group key update timing when the group key is updated, the system performs mutual authentication between the controller and the second device, and shares the updated group key with the second device.

18 Claims, 31 Drawing Sheets

Related U.S. Application Data

(60) Provisional application No. 61/940,901, filed on Feb. 18, 2014.

(51) Int. Cl.
*H04L 9/08* (2006.01)
*H04L 9/32* (2006.01)

(52) U.S. Cl.
CPC .......... *H04L 9/3268* (2013.01); *H04L 9/3273* (2013.01); *H04L 63/061* (2013.01); *H04L 63/062* (2013.01); *H04L 63/065* (2013.01); *H04L 63/068* (2013.01); *H04L 63/0823* (2013.01); *H04L 63/0876* (2013.01)

(56) References Cited

OTHER PUBLICATIONS

Atsuko Miyaji et al., "Information Security"Ohm-sha pp. 140-147, Oct. 25, 2003 (Partial Translation).
"Suite B Implementer's Guide to FIPS 186-3(ECDSA)" Feb. 3, 2010.
Elaine Barker et al., "Recommendation for Pair-Wise Key Establishment Schemes Using Discrete Logarithm Cryptography" NIST Special Publication 800-56A Revision 2, May 2013.
D. Forsberg et al., "Protocol for Carrying Authentication for Network Access (PANA)", RFC5191, May 2008.
The Extended European Search Report from the European Patent Office dated Jan. 31, 2017 for the related European Patent Application No. 14883080.5.

\* cited by examiner

FIG. 24

| DEVICE ID 2010 | CERTIFICATE ID 2020 | SHARED KEY 2030 | GROUP KEY 2040 | SESSION KEY 2050 | REMAINING SESSION TIME 2060 | SESSION UPDATE STATE 2070 | REFERENCE DEVICE 2080 |
|---|---|---|---|---|---|---|---|
| DEVICE ID1 | CERTIFICATE ID (M1) | 01234... | 11223... | 11122... | 13:40:50 | UPDATED | REFERENCE DEVICE |
| DEVICE ID2 | CERTIFICATE ID (M2) | 98765... | | 22233... | | UPDATED | — |
| ... | ... | ... | | ... | | ... | ... |

| DEVICE ID 3010 | CERTIFICATE ID 3020 | SHARED KEY 3030 | GROUP KEY (CURRENT) 3040 | GROUP KEY (NEW) 3050 | SESSION KEY 3060 | REMAINING SESSION TIME 3070 | SESSION UPDATE STATE 3080 | REFERENCE DEVICE 3090 |
|---|---|---|---|---|---|---|---|---|
| DEVICE ID1 | CERTIFICATE ID (M1) | 01234… | 11223… | 55666… | 11122… | 13:40:50 | UPDATED | REFERENCE DEVICE |
| DEVICE ID2 | CERTIFICATE ID (M2) | 98765… | | | 22233… | | UPDATED | — |
| … | … | … | | | … | | | … |

3000

AUTHENTICATION METHOD AND AUTHENTICATION SYSTEM

BACKGROUND

1. Technical Field

The present disclosure relates to a technique for authenticating a device connected to an area network and relates specifically to a technique for performing mutual authentication between a controller and a device and updating a group key.

2. Description of the Related Art

Currently, services that utilize various types of history information collected by a cloud server from home electrical appliances, AV devices, household equipment, and other devices having a network connection function (hereinafter simply referred to as "devices") are anticipated. A network formed by connecting devices installed in a home with one another is hereinafter referred to as a home area network.

In some cases, a specific device (hereinafter referred to as "controller") is connected to the home area network, and communication between the devices and an external server is performed via the controller. In such cases, it is necessary to control communication in the home by securely making connections between the controller and the devices and to prevent connections from being made by an unauthorized device conducting spoofing activity or information from leaking out by interception of the content of communication, for example. Countermeasures, such as authentication of a device to be connected, can be taken against the former case, and countermeasures, such as encryption of communication, can be taken against the latter case, for example. The controller and a device whose validity has been confirmed share an encryption key and perform encrypted communication with each other using the encryption key. In a case where there are a plurality of devices that are to be connected to the controller, the controller and the devices share the same encryption key (hereinafter referred to as "group key") to thereby enable encryption of multicast communication or broadcast communication in which the controller simultaneously transmits the same information to the plurality of devices.

In existing authentication systems as described above, group keys need to be further improved.

SUMMARY

In one general aspect, the techniques disclosed here feature an authentication method performed in an authentication system including a controller, a first device, and a second device. The authentication method includes: a first step comprising: performing mutual authentication between the controller and the first device, creating a group key, sharing the group key between the controller and the first device, and setting the first device as a reference device; a second step comprising: performing mutual authentication between the controller and the second device, and sharing the group key with the second device; a third step performed after the second step comprising: performing mutual authentication between the controller and the first device, updating the group key, and sharing the updated group key between the controller and the first device; and a fourth step performed at a group key update timing when the group key is updated comprising: performing mutual authentication between the controller and the second device, and sharing the updated group key with the second device.

According to the present disclosure, group keys used in authentication systems can be further improved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 24 is a diagram illustrating an example of a data structure and data of a connecting device management table according to a second embodiment;

FIG. 28 is a diagram illustrating an example of a data structure and data of a connecting device management table according to a third embodiment;

DETAILED DESCRIPTION

Underlying Knowledge Forming Basis of the Present Disclosure

In order to maintain security between devices and a controller, it is desired that the devices and the controller do not continue using the same group keys after mutual authentication performed upon connection and that the devices and the controller update the group keys.

However, if the devices update their group keys at respective timings, the devices respectively retain different group keys. For example, in a case where a first device retains a group key after an update but a second device retains a group key before an update, the controller is unable to simultaneously transmit (perform broadcast transmission) encrypted information to the devices using a group key.

The present disclosure has been made in view of the above-described issue and provides an authentication method with which devices and a controller can update their group keys at the same timing.

In the authentication method according to an aspect of the present disclosure, a device among the devices connected to the controller is set as a reference device, and devices other than the reference device update their group keys on the basis of a group key update timing of the reference device to thereby enable the plurality of devices to update their group keys at the same timing.

Accordingly, even if the controller and the devices perform mutual authentication and a group key update, the controller can simultaneously transmit encrypted information to the devices.

Hereinafter, embodiments of the present disclosure will be described with reference to the drawings. Note that the following embodiments are merely operative examples of the present disclosure and are not intended to limit the technical scope of the present disclosure.

1. First Embodiment 1-1. Overview

Hereinafter, an authentication system 10 using the authentication method according to the present disclosure will be described as one embodiment with reference to the drawings.

Figure 1:
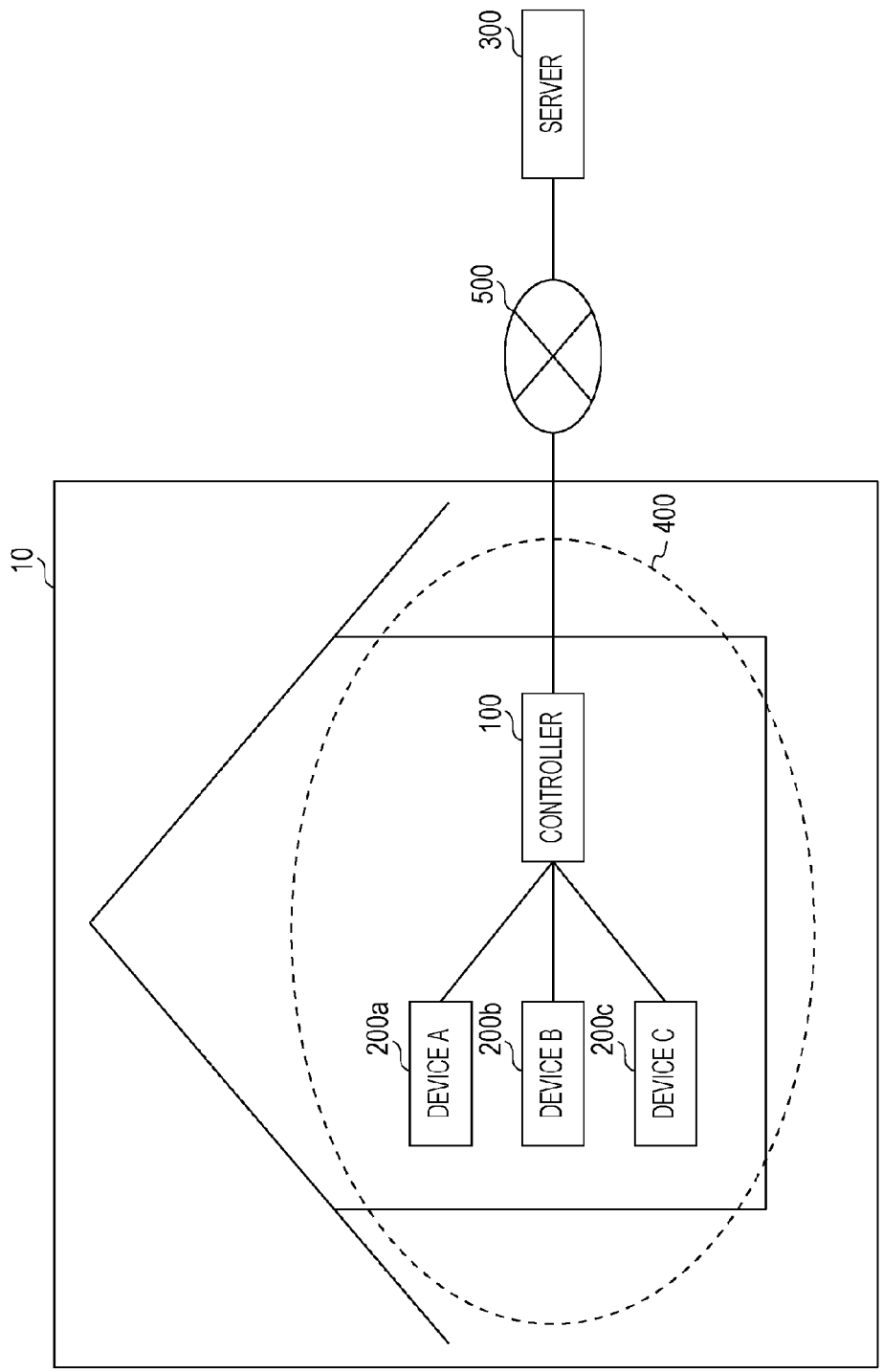
FIG. 1 is a schematic diagram illustrating a system configuration of an authentication system.

FIG. 1 is a schematic diagram illustrating an example of a system configuration of the authentication system 10 according to this embodiment.

The authentication system 10 includes a controller 100, a device 200a, a device 200b, and a device 200c that are connected to a home area network 400. The controller 100 in the authentication system 10 is connected to a server 300 over a network 500, which is a communication network, such as the Internet.

The controller 100 and the devices 200a to 200c are connected to one home area network 400 and may be connected to the home area network 400 via a network device (hub, router, or the like, for example), which is not illustrated. The controller 100 or the devices may be installed indoors or outdoors.

The controller 100 and each of the devices 200a to 200c perform mutual authentication when making a connection. In a case where their validity has been mutually confirmed as a result of mutual authentication, the controller and each of the devices 200a to 200c share an encryption key and perform encrypted communication. The controller and the respective devices thereafter perform a session update process at their predetermined respective timings, perform mutual authentication each time the session update process is performed, update their encryption keys if the result of mutual authentication shows that they are valid, and continue performing encrypted communication.

The controller 100 and each device share three types of shared keys after mutually confirming their validity in mutual authentication upon making a connection.

A first shared key is a shared key used by the controller 100 and each device in mutual authentication upon session update processing. When the controller and each device are to be connected to each other, the controller and the device first perform mutual authentication based on a public key infrastructure (PKI). The method for mutual authentication based on a PKI uses a general technique described in Atsuko Miyaji/Hiroaki Kikuchi, "IT Text Information Security", Ohmsha, Ltd., October 2003 and the like, and therefore, description thereof will be omitted. After the mutual authentication based on a PKI, mutual authentication upon session update processing is performed by the controller and the device using the first shared key. Hereinafter, "shared key" simply mentioned refers to the shared key used in the mutual authentication except for a case where the shared key obviously refers to a group key or a session key described below.

In encrypted communication between the controller and a device, a shared key encryption scheme is used, and therefore, the controller and the device share the shared key.

A second shared key and a third shared key are shared keys used in the encrypted communication and are respectively referred to as a group key and a session key. The group key is an encryption key used by the controller for simultaneously transmitting the same information to a plurality of devices, and the controller shares the same group key with all devices connected to the controller. The session key is an encryption key used by the controller and each device for performing one-to-one unicast communication, and the controller shares an individual encryption key with each device.

Here, it is assumed that a session validity period is set for communication between the controller and each device and that the group key and the session key are usable in the session validity period. In a case where the session validity period has elapsed after session establishment, control is performed so that the group key and the session key are no longer usable. In order to continue performing encrypted communication even after the session validity period has elapsed, the controller and each device need to perform a session update process, create a new group key and session key, and establish a new session.

The controller sets one of a plurality of devices that are connected to the controller as a reference device. The timings when the controller 100 and the devices respectively update their group keys is based on the timing when the reference device performs a session update process and updates its group key, and the method will be specifically described below. Note that the reference device is a device that is connected to the controller 100 first.

The server 300 is an external server that provides services and the like to the devices 200a to 200c. Communication between the server 300 and each device is performed via the controller 100.

For example, each device transmits device history information indicating operations of the device to the server 300 via the controller 100. The server 300 transmits service information to each device via the controller 100. Here, it is assumed that the server 300 transmits control request information for making each device execute a predetermined function. The controller 100 receives and interprets the control request information, and creates and transmits a control command for making each device execute the function. Each device that receives the control command executes the function requested by the server 300.

1-2. Configurations

The configurations of the controller 100 and the devices 200a to 200c, which are major constituent elements of the authentication system 10 according to this embodiment, and the configuration of the server 300 connected to the authentication system 10 will be described with reference to the drawings.

1-2-1. Controller 100

Figure 2:
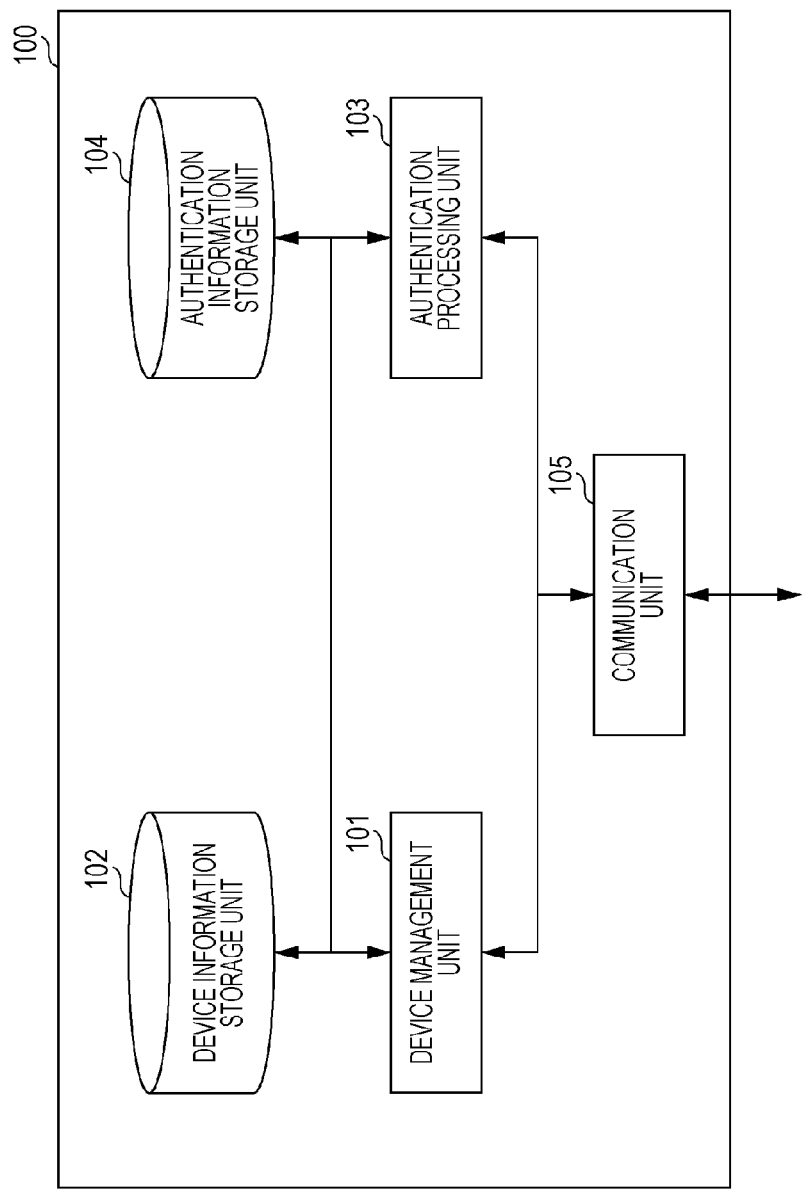
FIG. 2 is a functional block diagram of principal part of a controller.

FIG. 2 is a functional block diagram of principal part of the controller 100. The controller 100 includes a device management unit 101, a device information storage unit 102, an authentication processing unit 103, an authentication information storage unit 104, and a communication unit 105. The controller 100 includes a processor and a memory, which are not illustrated, and the functions of the device management unit 101, the device information storage unit 102, the authentication processing unit 103, the authentication information storage unit 104, and the communication unit 105 are implemented by the processor executing a program stored in the memory. Storage of data by the device information storage unit 102 and the authentication information storage unit 104 is implemented by using the memory.

Device Management Unit 101

The device management unit 101 has the following functions in order to control connections between the controller 100 and the devices 200a to 200c.

The device management unit 101 accepts via the communication unit 105 a connection request and a session update request made by a device to the controller 100 and makes the authentication processing unit 103 perform a mutual authentication process for the device.

In a case where the validity of the device is confirmed as a result of the authentication process performed by the authentication processing unit 103, the device management unit 101 registers connecting device management data in a connecting device management table 1000 stored in the device information storage unit 102. The connecting device management data stored in the connecting device management table 1000 will be described in detail below.

The device management unit 101 sets the reference device. For example, the device management unit 101 may set a device that is connected to the controller 100 first as the reference device. In a case where a connection with a device that is registered as the reference device is lost, the device management unit 101 extracts another device from the connecting device management table 1000 stored in the device information storage unit 102 and sets the device as the reference device. At this time, the device management unit 101 may set a device that is always turned on as the reference device. The device management unit 101 also registers the reference device having been set in the connecting device management table 1000. Upon making a connection with a device, the authentication processing unit 103 determines whether the device is set as the reference device, and the device management unit 101 registers the device in the connecting device management table 1000 in accordance with the result of determination.

The device management unit 101 refers to a session update state, which is an item of the connecting device management table 1000, and sends via the communication unit 105 a session update notification to a device that has not performed a session update. The session update notification is a notification for urging the device to update its session. The session is updated when a session update request made by the device to the controller 100 is newly accepted thereafter.

The device management unit 101 refers to a remaining session time, which is an item of the connecting device management table 1000, and disables encrypted communication with a device for which the session validity period has elapsed without performing a session update, that is, a device for which the remaining session time is zero, by deleting information about encryption keys, such as a group key and a session key, retained for the device.

The device management unit 101 decrypts encrypted device history information received from the devices 200a to 200c via the communication unit 105. The device management unit 101 transmits the decrypted device history information to the server 300 via the communication unit 105.

The device management unit 101 converts control request information for a device received from the server 300 via the communication unit 105 into a format with which an instruction can be given to the device, encrypts the control request information using the group key or the session key, and transmits the control request information to the device via the communication unit 105.

Device Information Storage Unit 102

Figure 3:
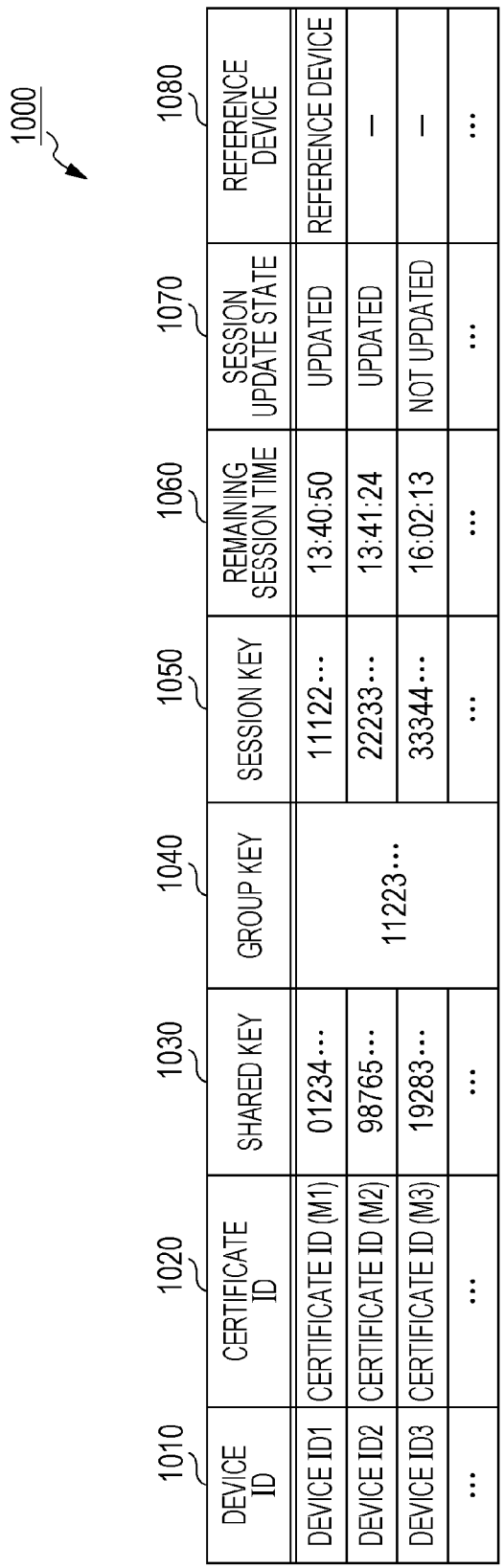
FIG. 3 is a diagram illustrating an example of a data structure and data of a connecting device management table.

The device information storage unit 102 stores information about the devices 200a to 200c connected to the controller 100. FIG. 3 is a diagram illustrating an example of a data structure and data of the connecting device management table 1000 stored in the device information storage unit 102 for managing information about the devices.

The connecting device management table 1000 is constituted by a group of connecting device management records for respective devices. The connecting device management record is data that is registered in a case where a device is recognized as a valid device in a device registration process that is performed when a connection is made between the device and the controller, and includes items, namely, a device ID 1010, a certificate ID 1020, a shared key 1030, a group key 1040, a session key 1050, a remaining session time 1060, a session update state 1070, and a reference device 1080.

Each item is described with reference to the example of data in FIG. 3.

The device ID 1010 is an identifier for uniquely identifying the device.

The certificate ID 1020 is the certificate ID of the public key certificate of the device.

The shared key 1030 is data about a shared key that is shared between the controller 100 and the device.

The group key 1040 is data about a group key used to encrypt information that is simultaneously transmitted by the controller 100 to a plurality of devices. FIG. 3 indicates that the same group key "11223 . . . " is shared with all of the devices ID1 to ID3 that are connected to the controller. In FIG. 3, although the example is illustrated where the devices ID1 to ID3 share one column of the group key item, individual item columns may be provided for the respective device IDs, and data about the same group key as that of the reference device may be set for devices other than the reference device upon registration of the item.

The session key 1050 is data about a session key used to encrypt unicast communication between the controller 100 and the device. The example in FIG. 3 indicates that the controller 100 shares different session keys with the respective devices ID1 to ID3.

The remaining session time 1060 is a remaining period of a session validity period that is set by the controller 100 and the device. A specific session validity period that is determined in advance is set for the controller 100 and the device. The session validity period is registered as the remaining session time 1060 each time a session is established or updated. Thereafter, the value of the item counts down as time passes, so that the remaining session time 1060 indicates the remaining period of the session validity period.

For a device for which the remaining session time becomes zero, the device management unit 101 deletes information about the group key and the session key that are retained for the device to thereby disable encrypted communication.

The session update state 1070 is data indicating whether the device indicated by the device ID has performed a session update with the controller 100 in a period after the controller 100 and the reference device have performed a session update. At the time when the controller 100 performs a session update with the reference device, the session update state 1070 of any device other than the reference device is updated to "not updated". Thereafter, at the time when the controller 100 performed a session update process for the device, the session update state 1070 is updated to "updated".

The item of the reference device 1080 is data indicating whether the device is the reference device.

The items of the session update state 1070 and the reference device 1080 in the example in FIG. 3 indicate that the device having device ID1 is the reference device and that the controller has already performed a session update with the device having device ID2 but has not performed a session update with the device having device ID3 after the controller 100 and the device having device ID1, which is the reference device, have performed a session update.

Authentication Processing Unit 103

The authentication processing unit 103 has a function of performing a mutual authentication process with a device that is connected to the controller 100. Upon making a connection with a device, the authentication processing unit 103 performs mutual authentication based on a PKI. Upon a session update, the authentication processing unit 103 performs mutual authentication based on challenge-response authentication that uses a shared key and random numbers.

The authentication processing unit 103 accepts from the device management unit 101 a request for authentication of a device and the public key certificate of the device and performs an authentication process based on a PKI. Specifically, the authentication processing unit 103 first confirms, on the basis of a CRL (Certificate Revocation List) stored in the authentication information storage unit 104, that the certificate ID of the obtained public key certificate of the device is not included in the CRL. The authentication processing unit 103 verifies a signature added to the public key certificate by using the public key of a certifying authority. Here, it is assumed that the certifying authority is the server 300.

The authentication processing unit 103 performs challenge-response authentication, which is mutual authentication using a shared key, upon a session update between the controller 100 and a device. The authentication processing unit 103 also has a function of creating the shared key through a key exchange with the device. The authentication processing unit 103 generates random numbers and transmits the random numbers to the device via the communication unit 105. The authentication processing unit 103 decrypts random numbers that the device has encrypted using its shared key and has returned by using the shared key retained by the controller and checks the result against the random numbers that the authentication processing unit 103 has created to thereby confirm the validity of the device. Similarly, the authentication processing unit 103 encrypts the random numbers received from the device by using its shared key and returns the result, and the device performs verification.

The authentication processing unit 103 further has a function of performing processes necessary for establishing and updating a session. Specifically, the authentication processing unit 103 creates a group key and a session key, which are shared keys for encrypting communication between the controller 100 and a device. The authentication processing unit 103 also sets the session validity period and registers the session validity period in the connecting device management table 1000 stored in the device information storage unit 102 via the device management unit 101 together with the session key and the group key.

Authentication Information Storage Unit 104

The authentication information storage unit 104 stores the private key and the public key certificate of the controller 100. The authentication information storage unit 104 also stores the CRL used in mutual authentication based on a PKI to confirm that the public key certificate of a counterpart device has not expired. The private key, the public key certificate, and the CRL are embedded in the controller 100 upon manufacturing of the controller 100.

Figure 4:
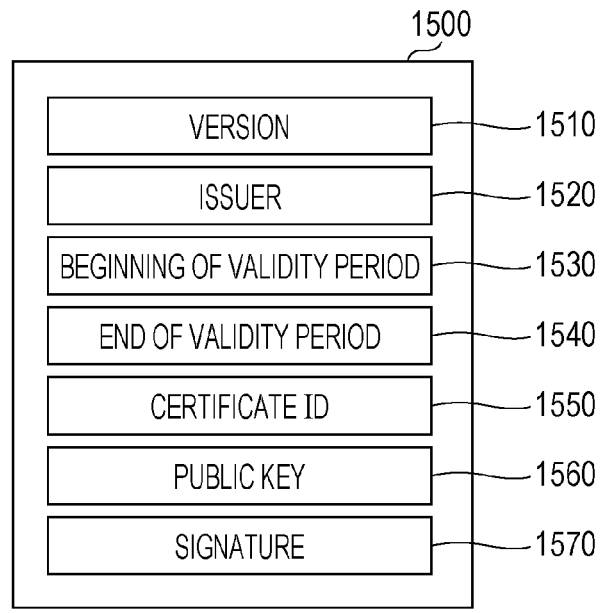
FIG. 4 is a diagram illustrating an example of a data structure of a public key certificate.

FIG. 4 is a diagram illustrating a data structure of a public key certificate 1500, which is an example of a standard data structure of a public key certificate. The public key certificate 1500 includes a version 1510, an issuer 1520, the beginning of the validity period 1530, the end of the validity period 1540, a certificate ID 1550, a public key 1560, and a signature 1570 of the server 300, which is the certifying authority, related to the certificate. Here, the public key 1560 is data about the public key of the controller, and the signature 1570 is a signature created by using the private key of the certifying authority and added.

Figure 5:
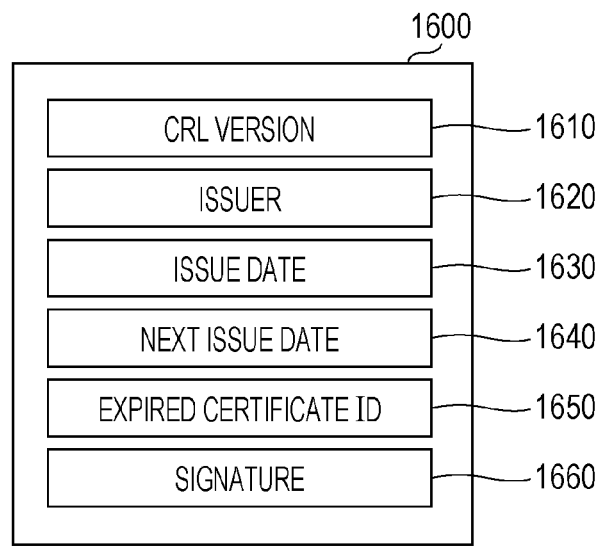
FIG. 5 is a diagram illustrating an example of a data structure of a CRL.

FIG. 5 is a diagram illustrating a CRL 1600, which is an example of a standard data structure of a CRL. The CRL 1600 includes a CRL version 1610, an issuer 1620, an issue date 1630, a next issue date 1640, an expired certificate ID 1650, and a signature 1660 of the server, which is the certifying authority, related to the CRL. Here, only one ID need not be included in the expired certificate ID 1650, and IDs of a plurality of expired certificates may be included. Further, the signature 1660 is a signature created by using the private key of the certifying authority and added.

Communication Unit 105

The communication unit 105 is a communication interface for the controller 100 to make a connection to each of the devices 200a to 200c and the server 300. For example, the communication unit 105 has a function of performing encrypted communication with the devices 200a to 200c by using the session keys and the group key stored in the connecting device management table 1000 of the device information storage unit 102.

The communication unit 105 further has a function of performing encrypted communication with the server 300 and performs SSL (Secure Socket Layer) communication, for example. Here, an SSL server certificate necessary for SSL communication is retained by the communication unit 105.

1-2-2. Device 200a

The devices 200a to 200c are home electrical appliances, AV devices, or household equipment having a function of connecting to a network and are specifically televisions, recorders, air conditioners, refrigerators, storage batteries, or the like, for example.

Hereinafter, the configurations of the devices, typically, the configuration of the device 200a, will be described. Note that the devices respectively have functions specific thereto, and therefore, a device of a different type is not the same as other devices in this regard. For example, a specific function is a washing function of a washing machine or heating and cooling functions of an air conditioner, for example. These functions are general functions, and therefore, description thereof will be omitted. Only functions related to the authentication method, which is the present disclosure, will be described. Regarding these functions, other devices as well as the device 200a have the same functions as a matter of course.

Figure 6:
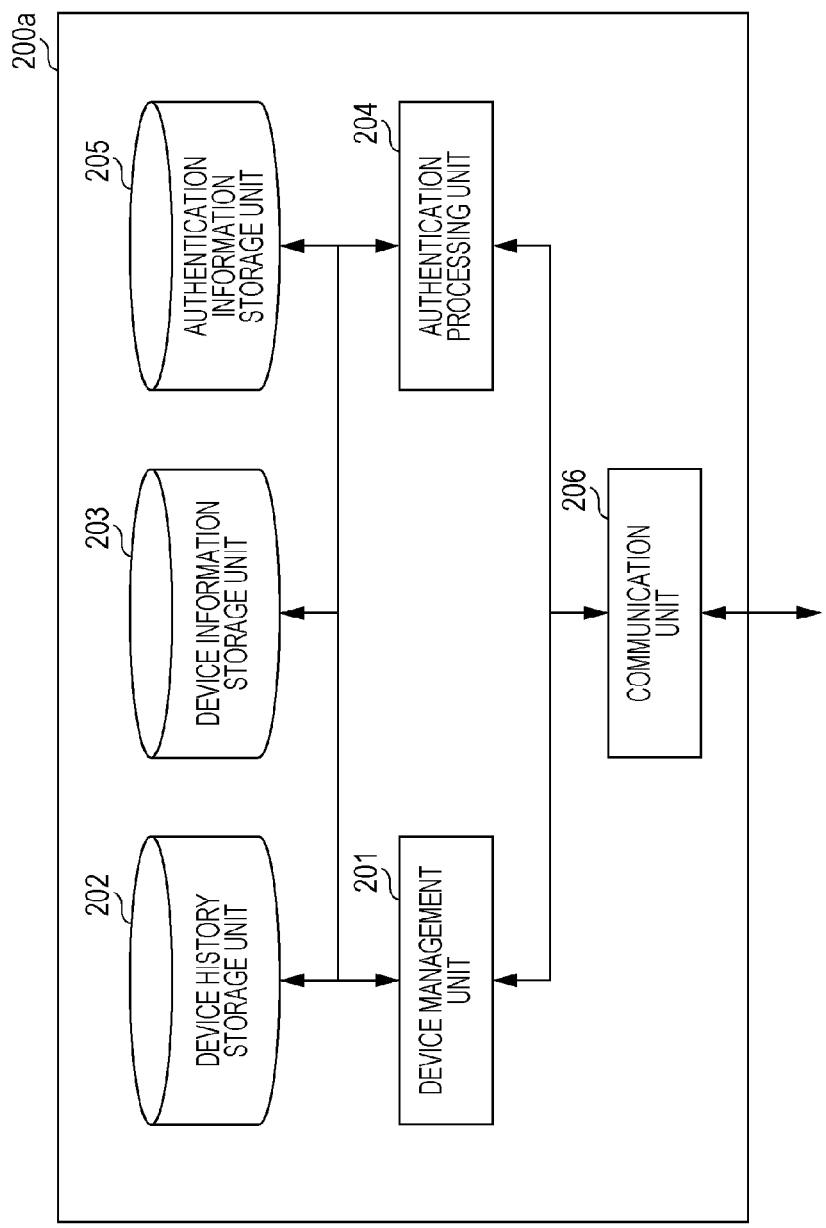
FIG. 6 is a functional block diagram of principal part of a device.

FIG. 6 is a functional block diagram of principal part of the device 200a. The device 200a includes a device management unit 201, a device history storage unit 202, a device information storage unit 203, an authentication processing unit 204, an authentication information storage unit 205, and a communication unit 206. The device 200a includes a processor and a memory, which are not illustrated, and the functions of the device management unit 201, the device history storage unit 202, the device information storage unit 203, the authentication processing unit 204, the authentication information storage unit 205, and the communication unit 206 are implemented by the processor executing a program stored in the memory. Storage of data by the device history storage unit 202, the device information storage unit 203, and the authentication information storage unit 205 is implemented by using the memory.

Device Management Unit 201

The device management unit 201 controls a connection with the controller 100. Specifically, the device management unit 201 has the following functions.

The device management unit 201 transmits a connection request to the controller 100 via the communication unit 206 upon making a connection with the controller 100.

When the device management unit 201 receives the public key certificate of the controller 100 via the communication unit 206, the device management unit 201 makes the authentication processing unit 204 perform an authentication process based on a PKI.

In a case where the validity of the controller 100 is confirmed as a result of the authentication process performed by the authentication processing unit 204, the device management unit 201 registers connecting controller data in a connecting controller management table 1100 stored in the device information storage unit 203. The connecting controller data stored in the connecting controller management table 1100 will be described in detail below.

The device management unit 201 encrypts device history information about an operation history of the device recorded to the device history storage unit 202 by using the session key and transmits the result to the controller 100 via the communication unit 206. The device history information about operations of the device is transmitted to the server 300 via the controller 100 at regular or irregular intervals.

The device management unit 201 refers to an item of a remaining session time stored in the connecting controller management table of the device information storage unit 203 and starts a session update at the time when the value of the remaining session time decreases to a specific threshold determined in advance or below. The specific threshold is set to a value equal to 10% of the session validity period or a value equal to twice the time necessary for a session update process, for example. However, when the device management unit 201 receives a session update notification from the controller 100, the device management unit 201 starts a session update regardless of the value of the remaining session time.

When the device management unit 201 starts a session update, the device management unit 201 makes the authentication processing unit 204 perform processing. Thereafter, the device management unit 201 receives a group key, a session key, and a session validity period created by the authentication processing unit 204 and registers the group key, the session key, and the session validity period in the connecting controller management table 1100 stored in the device information storage unit 203.

Device History Storage Unit 202

The device history storage unit 202 has a function of recording operations of the device 200a as device history information and storing the information. Each time the device 200a is operated or executes a function, the device history storage unit 202 records information indicating the operation as device history information. Although the device history information is mentioned as an example of information that the device 200a transmits to the server 300 via the controller 100, the device history information is not a principal constituent element of the present disclosure. Therefore, detailed description of the data items and the like will be omitted.

Device Information Storage Unit 203

Figure 7:
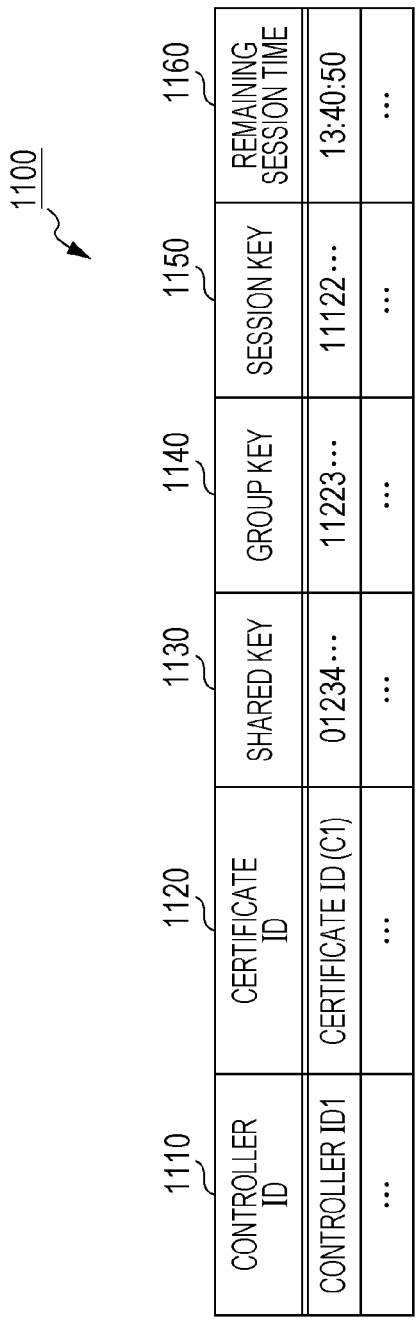
FIG. 7 is a diagram illustrating an example of a data structure and data of a connecting controller management table.

The device information storage unit 203 stores information about the controller 100 that is connected to the device 200a. FIG. 7 is a diagram illustrating an example of a data structure and data of the connecting controller management table 1100 that is stored in the device information storage unit 203 for managing information about the controller.

The connecting controller management table 1100 is constituted by a group of connecting controller management records. The connecting controller management record is data that is registered in a case where a controller is recognized as a valid device in a device registration process that is performed when a connection is made between the device and the controller, and includes items, namely, a controller ID 1110, a certificate ID 1120, a shared key 1130, a group key 1140, a session key 1150, and a remaining session time 1160.

Each item is described with reference to the example in FIG. 7.

The controller ID 1110 is an identifier for uniquely identifying the controller.

The certificate ID 1120 is the certificate ID of the public key certificate of the controller.

The shared key 1130 is data about a shared key that the device 200a shares with the controller 100.

The group key 1140 is data about a shared key used to encrypt information that is simultaneously transmitted by the controller 100 to devices. The devices decrypt the received information by using the group key.

The session key 1150 is data about a shared key used to perform encrypted unicast communication with the controller 100.

The remaining session time 1160 is a remaining period of a session validity period that is set with the controller 100. A specific session validity period that is determined in advance is set for the device 200a and the controller 100. The session validity period is registered as the remaining session time 1160 each time a session is established or updated. Thereafter, the value of the item counts down as time passes, so that the remaining session time 1160 indicates the remaining period of the session validity period.

Authentication Processing Unit 204

The authentication processing unit 204 has a function of performing a mutual authentication process with the controller 100. Upon making a connection with the controller, the authentication processing unit 204 performs mutual authentication based on a PKI. Upon a session update, the authentication processing unit 204 performs mutual authentication based on challenge-response authentication that uses a shared key and random numbers.

The authentication processing unit 204 accepts from the device management unit 201 a request for authentication of a controller and the public key certificate of the controller and performs an authentication process based on a PKI. Specifically, the authentication processing unit 204 confirms, on the basis of a CRL stored in the authentication information storage unit 205, that the certificate ID of the obtained public key certificate of the controller is not included in the CRL. The authentication processing unit 204 verifies a signature added to the public key certificate by using the public key of a certifying authority. Here, it is assumed that the certifying authority is the server 300.

The authentication processing unit 204 performs challenge-response authentication, which is mutual authentication using a shared key, with the controller 100 upon a session update. The authentication processing unit 204 also has a function of creating the shared key through a key exchange with the controller 100. The authentication processing unit 204 generates random numbers and transmits the random numbers to the controller 100 via the communication unit 206. The authentication processing unit 204 decrypts random numbers that the controller 100 has encrypted using its shared key and has returned by using the shared key retained by the device and checks the result against the random numbers that the authentication processing unit 204 has created to thereby confirm the validity of the controller. Similarly, the authentication processing unit 204 encrypts the random numbers received from the controller by using its shared key and returns the result, and the controller performs verification.

The authentication processing unit 204 further has a function of performing processes necessary for creating and updating a session. Specifically, when the authentication processing unit 204 accepts an instruction for starting a session update process from the device management unit 201, the authentication processing unit 204 transmits a session update request to the controller 100 via the communication unit 206. The authentication processing unit 204 receives a session key, a group key, and a session validity period after the update from the controller 100 via the communication unit 206 and registers the session key, the group key, and the session validity period in the connecting controller management table 1100 stored in the device information storage unit 203 via the device management unit 201.

Authentication Information Storage Unit 205

The authentication information storage unit 205 stores the private key and the public key certificate of the device 200a. The authentication information storage unit 205 also stores the CRL used in mutual authentication based on a PKI to confirm that a public key certificate has not expired. The private key, the public key certificate, and the CRL are embedded in the device upon manufacturing of the device.

The data structures of the CRL and the public key certificate are similar to those stored in the authentication information storage unit 104 of the controller 100, and therefore, description thereof will be omitted. As a matter of course, the public key included in the public key certificate of the device 200a is the public key of the device 200a.

Communication Unit 206

The communication unit 206 is a communication interface for making a connection to the controller 100. For example, the communication unit 206 has a function of performing encrypted communication with the controller 100 by using the session key and the group key stored in the connecting controller management table 1100 of the device information storage unit 203.

1-2-3. Server 300

Figure 8:
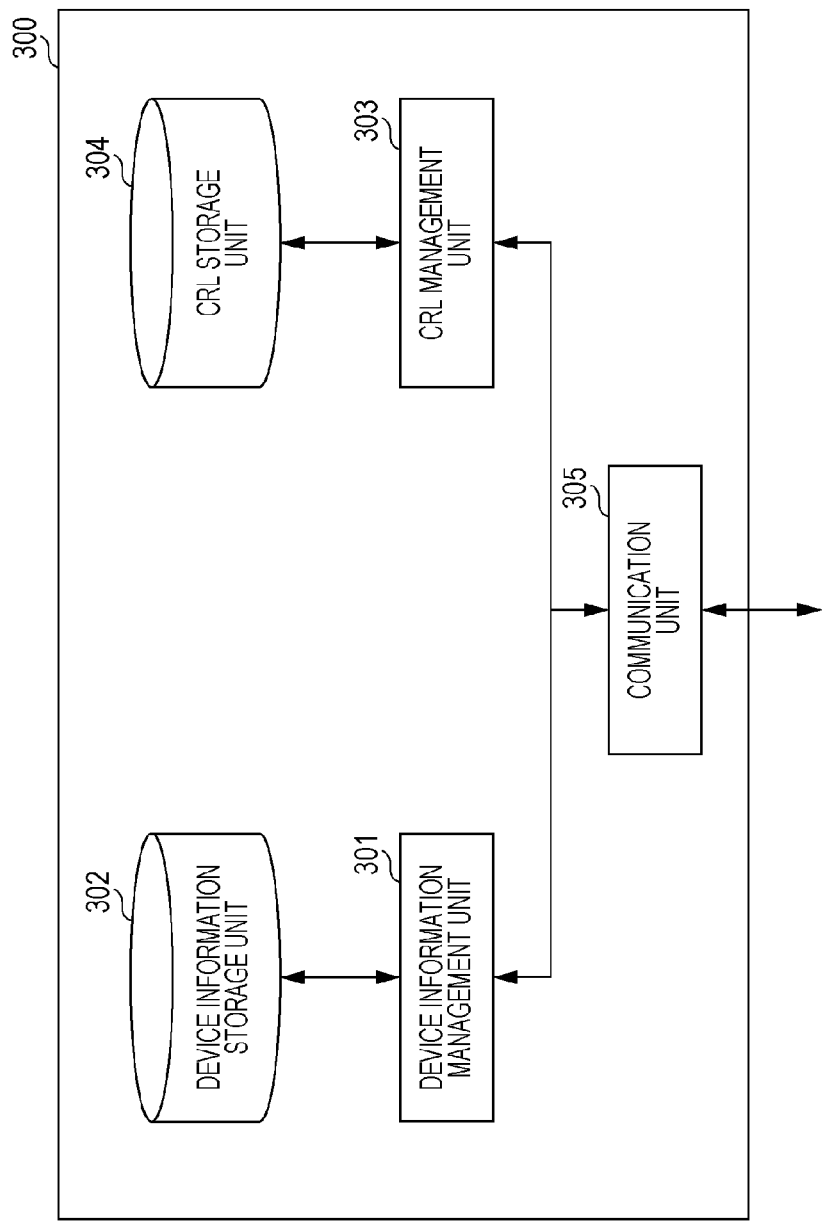
FIG. 8 is a functional block diagram of principal part of a server.

FIG. 8 is a functional block diagram of principal part of the server 300. The server 300 includes a device information management unit 301, a device information storage unit 302, a CRL management unit 303, a CRL storage unit 304, and a communication unit 305. The server 300 includes a processor and a memory, which are not illustrated, and the functions of the device information management unit 301, the device information storage unit 302, the CRL management unit 303, the CRL storage unit 304, and the communication unit 305 are implemented by the processor executing a program stored in the memory. Storage of data by the device information storage unit 302 and the CRL storage unit 304 is implemented by using the memory.

Device Information Management Unit 301

The device information management unit 301 has the following functions for controlling the device information storage unit 302 and managing information about a controller that is connected to the server 300 and information about devices that are connected to the controller.

The device information management unit 301 registers information about the controller and devices received from the controller via the communication unit 305 in a device information management table 1300 stored in the device information storage unit 302.

In a case where the device information management unit 301 receives, from the controller, information about a device that is determined to be invalid in mutual authentication between the controller and the device, the device information management unit 301 communicates the certificate ID of the public key certificate of the device to the CRL management unit 303.

Device Information Storage Unit 302

Figure 9:
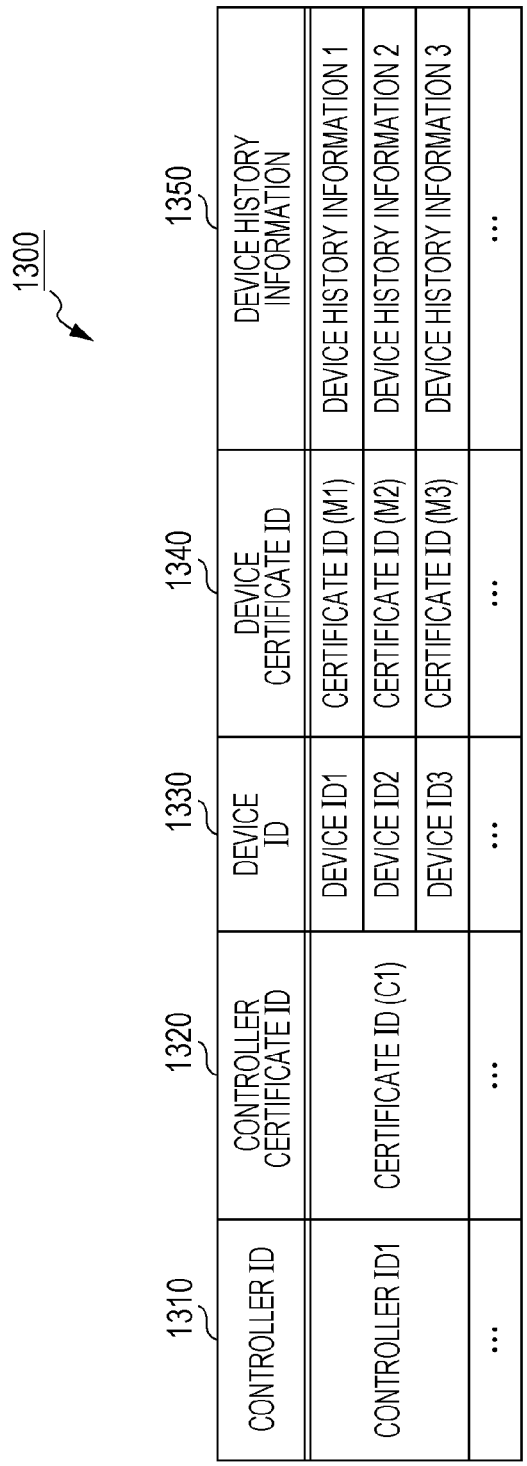
FIG. 9 is a diagram illustrating an example of a data structure and data of a device information management table.

The device information storage unit 302 stores information about a controller that is connected to the server 300 and about devices. FIG. 9 is a diagram illustrating an example of a data structure and data of the device information management table 1300 included in the device information storage unit 302.

The device information management table 1300 includes items related to the controller, namely, a controller ID 1310 and a certificate ID 1320. The device information management table 1300 further includes items related to a device that is connected to the controller, namely, a device ID 1330, a certificate ID 1340, and device history information 1350. Each item is described with reference to the example in FIG. 9.

The controller ID 1310 is an identifier for uniquely identifying the controller.

The controller certificate ID 1320 is the certificate ID of the public key certificate of the controller.

The device ID 1330 is a device ID for identifying a device that is connected to the controller. The example in FIG. 9 indicates that three devices identified by using device ID1, device ID2, and device ID3 are connected to the controller that is identified by using controller ID1.

The device certificate ID 1340 is the certificate ID of the public key certificate of the device.

The device history information 1350 is data about device history information collected from a device. Here, the device history information itself may be stored in a separate table for each device, and information about a link to the separate table may be included in the item of the device history information 1350.

CRL Management Unit 303

When the CRL management unit 303 accepts the certificate ID of the public key certificate of an unauthorized device from the device information management unit 301, the CRL management unit 303 issues a CRL.

The CRL management unit 303 retains the public key and the private key of the server 300.

The CRL management unit 303 adds, upon issuance of a CRL, a signature created by using the private key of the server 300 to the CRL. A controller and a device that use the CRL verify the signature added to the CRL by using the public key of the server 300 to thereby confirm that the CRL is valid.

The CRL issued by the CRL management unit is transmitted to the controller and devices via the communication unit 305.

CRL Storage Unit 304

The CRL storage unit 304 stores a CRL issued by the CRL management unit 303. The data structure of the CRL is similar to that stored in the authentication information storage unit 104 of the controller 100, and therefore, description thereof will be omitted.

Communication Unit 305

The communication unit 305 is a communication interface for communicating with the controller 100. Communication between the server 300 and the controller 100 is performed through SSL communication, for example. A certificate necessary for SSL communication is retained by the communication unit 305.

1-3. Operations

Hereinafter, "device registration process", "session update process", "PKI-based mutual authentication to shared key creation", "shared-key-using mutual authentication to session-related information creation", "device history information transmission process", and "control information transmission process" performed in the authentication system 10 will be described one by one. Note that "PKI-based mutual authentication to shared key creation", which is a process performed in "device registration process", and "shared-key-using mutual authentication to session-related information creation", which is a process performed in "device registration process" and "session update process", are illustrated as subroutines for convenience.

Device Registration Process

Figure 10:
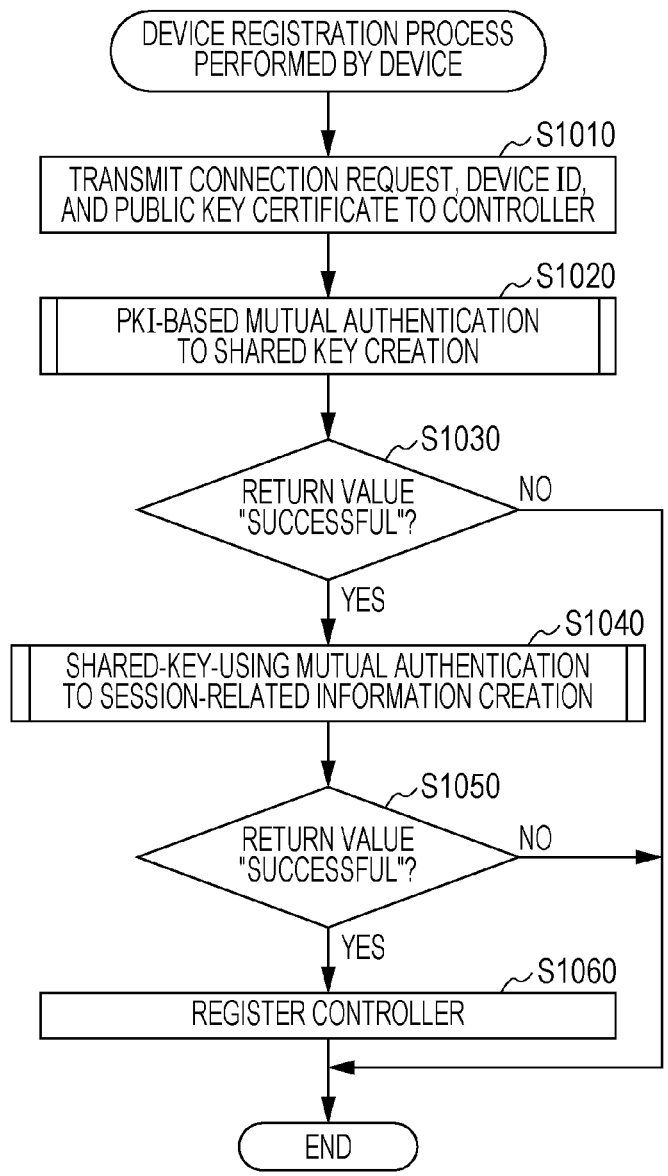
FIG. 10 is a flowchart illustrating an example of a procedure of a device registration process performed by the device.
Figure 11:
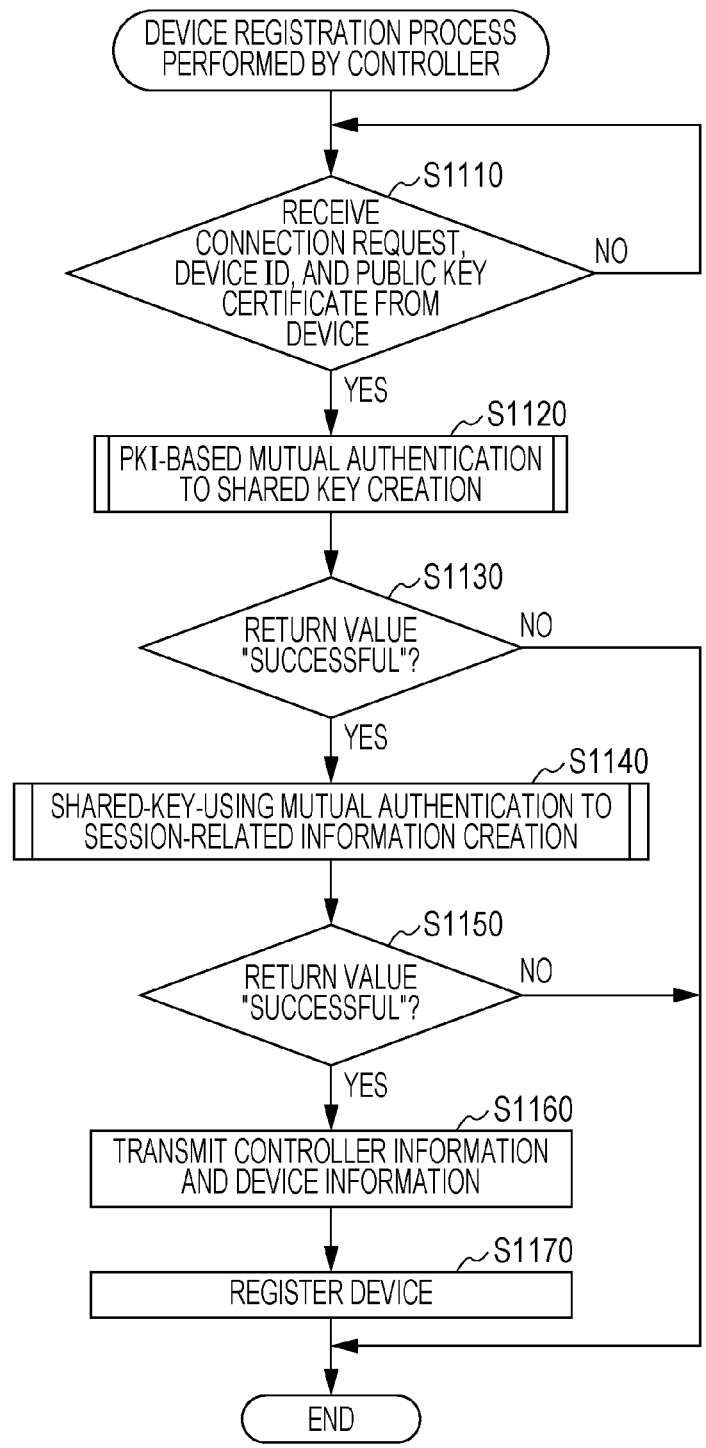
FIG. 11 is a flowchart illustrating an example of a procedure of a device registration process performed by the controller.
Figure 12:
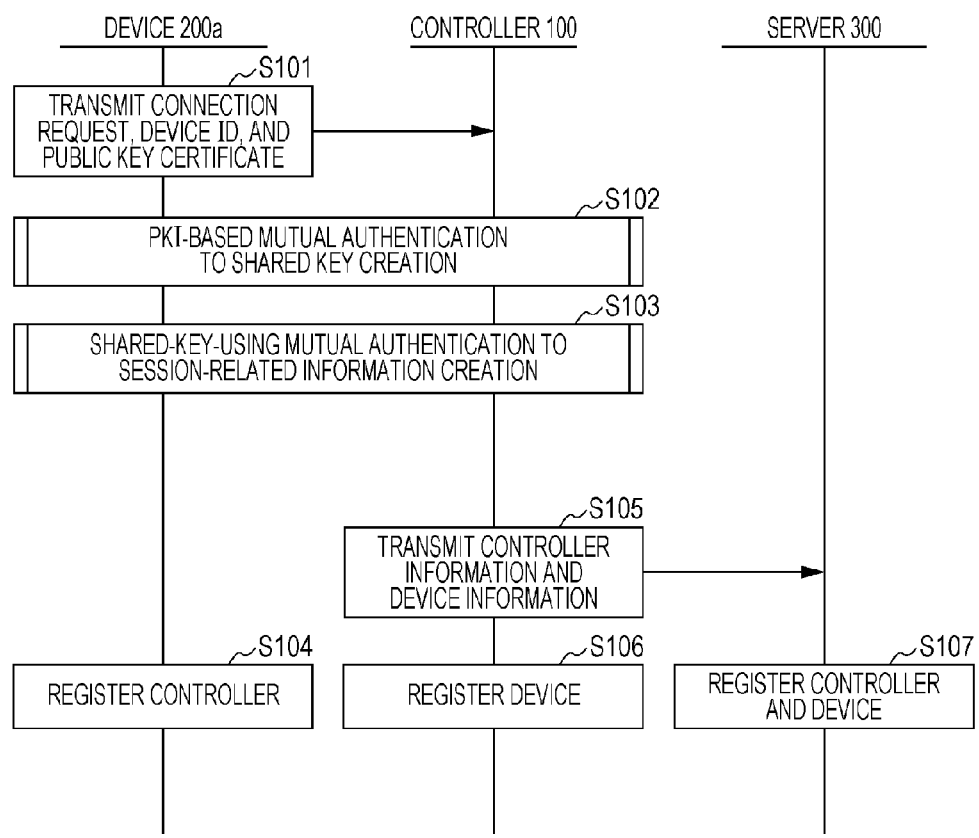
FIG. 12 is a sequence chart illustrating an example of a procedure of a device registration process.

FIG. 10 and FIG. 11 are flowcharts illustrating examples of procedures of device registration processes respectively performed by a device and the controller. FIG. 12 is a sequence chart illustrating an example of a procedure of the device registration process that includes interaction between a device and the controller.

The device registration process is a process that is performed when the controller 100 and a device are to be connected to each other and is a procedure in which the device makes a connection request to the controller 100, and the device and the controller 100 register each other after mutual authentication. First, the processes respectively performed by a device and the controller are outlined with reference to the flowcharts in FIG. 10 and FIG. 11. Then, a more detailed procedure of the device registration process including interaction between a device and the controller is described with reference to the sequence chart in FIG. 12.

The device registration process performed by a device is outlined with reference to the flowchart in FIG. 10.

First, a device transmits the device ID and the public key certificate thereof to the controller together with a connection request (step S1010).

Next, the device executes the subroutine "PKI-based mutual authentication to shared key creation" to thereby perform mutual authentication with the controller and thereafter share a shared key (step S1020). The subroutine process will be described in detail below.

If the return value from the subroutine in step S1020 is "successful" (Yes in step S1030), the device executes the subroutine "shared-key-using mutual authentication to session-related information creation" to thereby perform mutual authentication with the controller using the shared key, thereafter create a group key and a session key, and set the session validity period, the group key, session key, and session validity period being session-related information (step S1040). The subroutine process will be described in detail below.

If the return value from the subroutine in step S1040 is "successful" (Yes in step S1050), the device registers information about the controller as a valid connecting counterpart (step S1060).

On the other hand, if the return value from the subroutine in step s1020 is "error" (No in step S1030) or if the return value from the subroutine in step S1040 is "error" (No in step S1050), the device ends the device registration process.

Next, the device registration process performed by the controller is outlined with reference to the flowchart in FIG. 11.

The controller waits for a connection request from a device and the device ID and public key certificate of the device (step S1110). If these have not been received (No in step S1110), the controller continues waiting for a connection request from a device.

If a connection request has been received (Yes in step S1110), the controller performs the subroutine "PKI-based mutual authentication to shared key creation" to thereby perform mutual authentication with the device and thereafter share a shared key (step S1120). The subroutine process will be described in detail below.

If the return value from the subroutine in step S1120 is "successful" (Yes in step S1130), the controller executes the subroutine "shared-key-using mutual authentication to session-related information creation" to thereby perform mutual authentication with the device using the shared key, thereafter create a group key and a session key, and set the session validity period, the group key, session key, and session validity period being session-related information (step S1140). The controller determines whether the device is set as the reference device (step S1140). The subroutine process will be described in detail below.

If the return value from the subroutine in step S1140 is "successful" (Yes in step S1150), the controller transmits information about the controller and the device to the server 300 (step S1160).

The controller registers information about the device as a valid connecting counterpart (step S1170).

On the other hand, if the return value from the subroutine in step s1120 is "error" (No in step S1130) or if the return value from the subroutine in step S1140 is "error" (No in step S1150), the controller ends the device registration process.

Hereinafter, the details of the process including interaction between a device and the controller will be described with reference to the sequence chart in FIG. 12. Although description will be given while assuming the device 200a to be the device, for example, the process related to the device 200b and the device 200c is performed by following a procedure similar to that for the device 200a as a matter of course. The sequence chart illustrates a case where no error occurs, for example, and a process to be performed in a case where an error occurs will be described below.

The device registration process is a process to be performed when a new device is to be connected to the controller 100. For example, the device registration process is performed at the time when a new device is added to a home area network to which the controller belongs or at the time when a device that is on the network and that has been turned off is turned on.

The device management unit 201 of the device 200a transmits a connection request to the controller 100 via the communication unit 206 (step S101). At this time, the device management unit 201 of the device 200a also transmits the device ID and the public key certificate of the device 200a.

The device management unit 101 of the controller 100 accepts the connection request via the communication unit 105 and makes the authentication processing unit 103 perform mutual authentication based on a PKI. In response to this, the authentication processing unit 103 of the controller 100 and the authentication processing unit 204 of the device 200a perform a mutual authentication process based on a PKI and mutually confirm their validity (step S102).

The authentication processing unit 103 of the controller 100 and the authentication processing unit 204 of the device 200a respectively create shared keys by using a key exchange algorithm (step S102). The shared keys are used in mutual authentication performed thereafter. The process "PKI-based mutual authentication to shared key creation" in step S102 described above is illustrated as a subroutine for convenience, and the procedure will be described below. If the return value from the subroutine process is "error", the controller and the device end the device registration process.

Subsequently, the authentication processing unit 103 of the controller 100 and the authentication processing unit 204 of the device 200a perform mutual authentication using the created shared keys and create session-related information (step S103). Mutual authentication using the shared keys is performed again in step S103 also for verifying the shared keys themselves. In step S102, the shared keys are created by using a key exchange algorithm. That is, the controller 100 and the device 200a respectively create shared keys by following predetermined procedures. Accordingly, in order to also confirm that the shared keys that have been separately created are the same, performing mutual authentication using the shared keys in step S103 is effective.

If mutual authentication using the shared keys is successful, a group key, a session key, and a session validity period, which are session-related information, are created (step S103). Further, it is determined whether the device 200a is set as the reference device (step S103). The process "shared-key-using mutual authentication to session-related information creation" in step S103 is illustrated as a subroutine for convenience, and the procedure will be described below. If the return value from the subroutine process is "error", the controller and the device end the device registration process.

The authentication processing unit 204 of the device 200a registers the controller ID of the controller 100 and information about the shared key, group key, and session key that are shared with the controller 100 in the connecting controller management table 1100 included in the device information storage unit 203 via the device management unit 201. Further, the authentication processing unit 204 of the device 200a registers the session validity period as the remaining session time item in the connecting controller management table 1100 (step S104).

The device management unit 101 of the controller 100 transmits to the server 300 the controller ID and the certificate ID of the public key certificate of the controller 100, and the device ID and the certificate ID of the public key certificate of the device 200a (step S105). At this time, communication with the server is performed through SSL (Secure Socket Layer) communication.

The device management unit 101 of the controller 100 registers the device ID of the device 200a and information about the shared key, group key, and session key that are shared with the device 200a in the connecting device management table 1000 included in the device information storage unit 102. At this time, the device management unit 101 of the controller 100 registers the session validity period as the remaining session time item in the connecting device management table 1000. In a case where the device 200a is set as the reference device, the device management unit 101 of the controller 100 registers the device 200a as the reference device in the reference device item in the connecting device management table 1000 (step S106). In the process "shared-key-using mutual authentication to session-related information creation" in step S103, it is determined whether the device 200a is to be set as the reference device. A device that is connected to the controller first is set as the reference device, for example.

The server 300 receives information about the controller and the device from the controller 100 via the communication unit 305. The device information management unit 301 registers the controller ID and the certificate ID related to the controller and the device ID and the certificate ID related to the authenticated device in the device information management table 1300 included in the device information storage unit 302 (step S107).

Session Update Process

Figure 13:
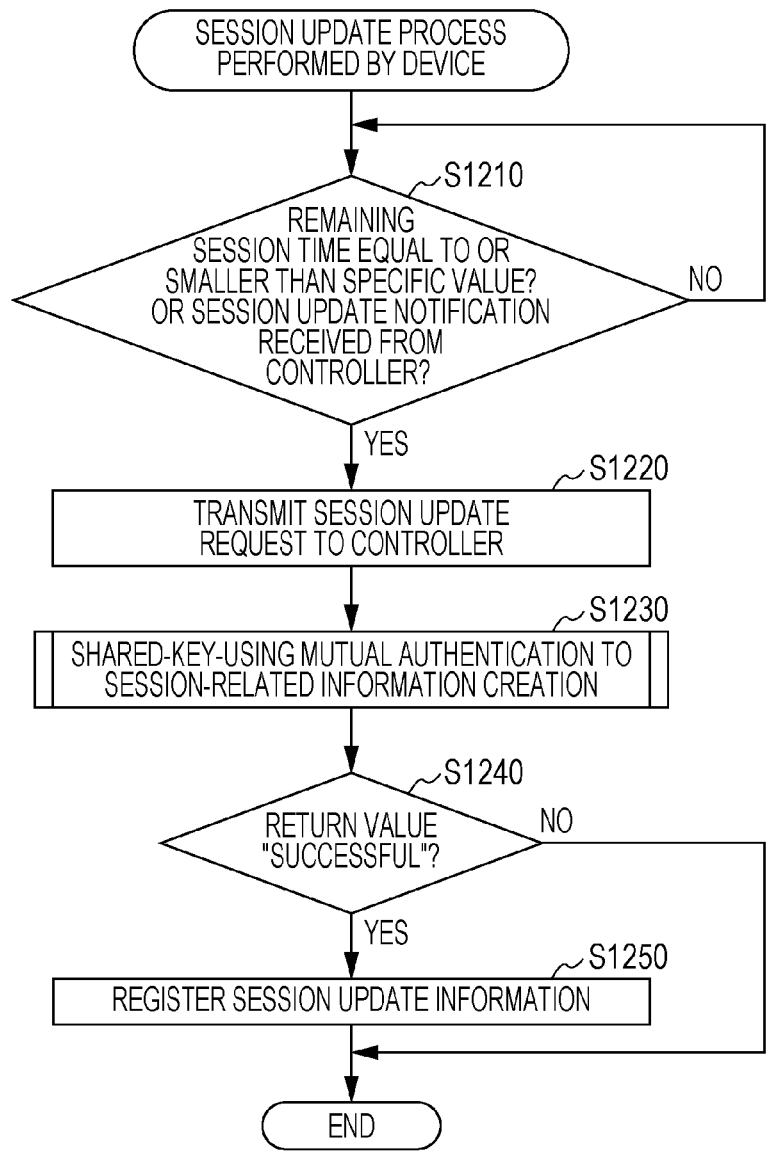
FIG. 13 is a flowchart illustrating an example of a procedure of a session update process performed by the device.
Figure 14:
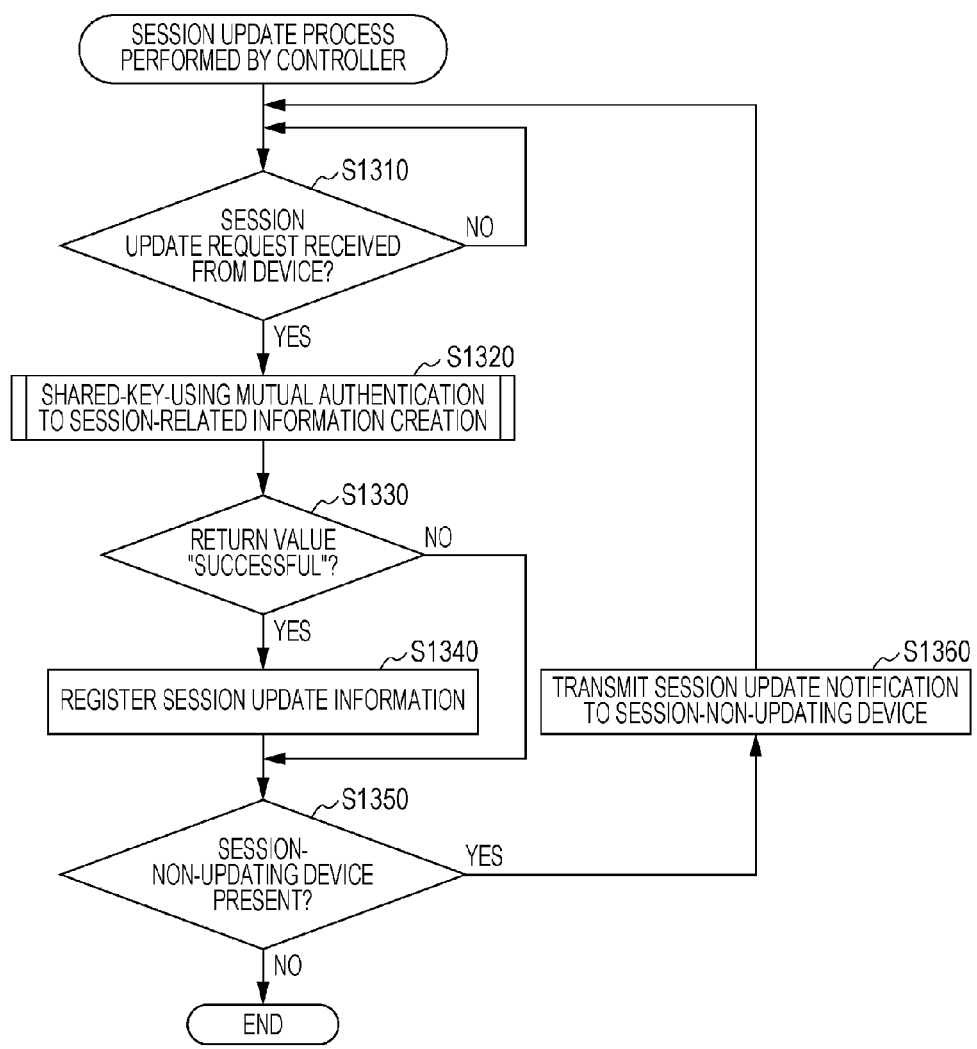
FIG. 14 is a flowchart illustrating an example of a procedure of a session update process performed by the controller.
Figure 15:
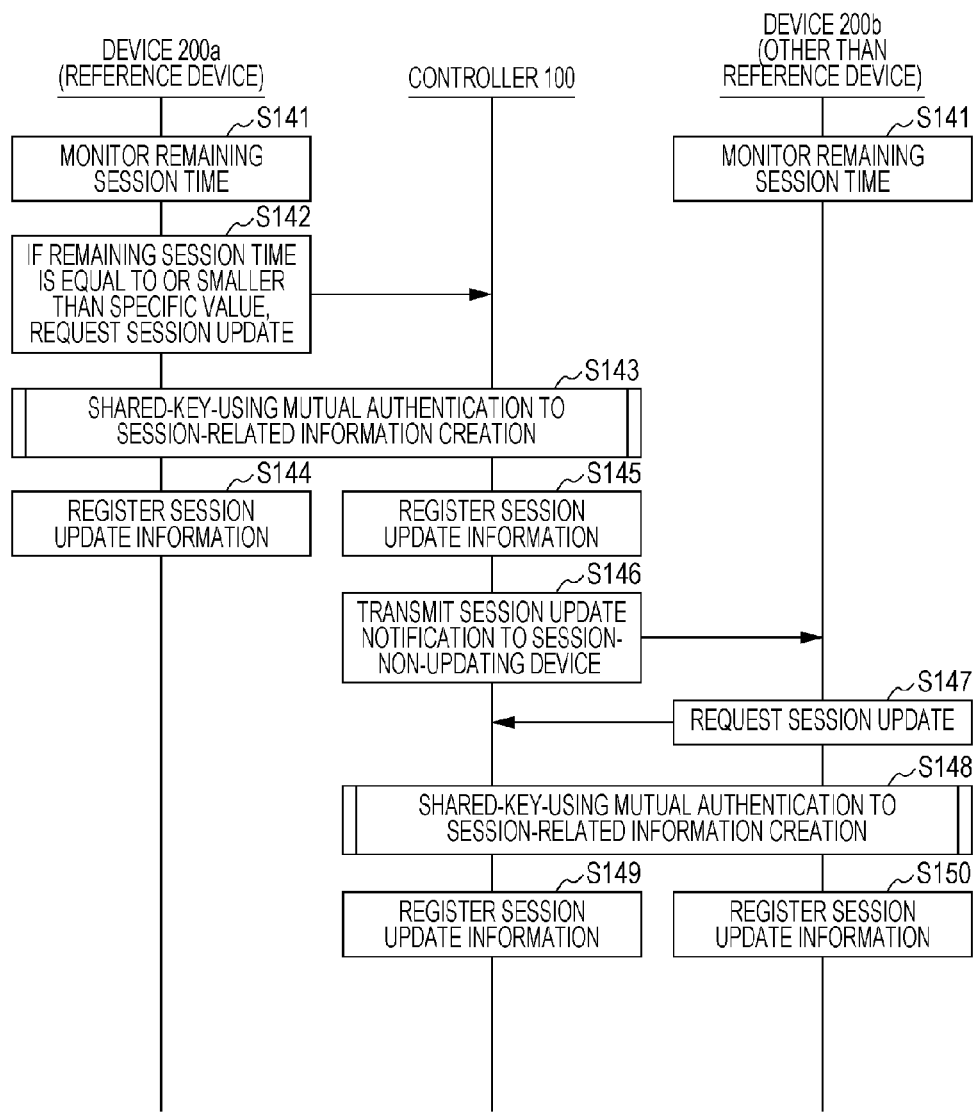
FIG. 15 is a sequence chart illustrating an example of a procedure of a session update process.

FIG. 13 and FIG. 14 are flowcharts illustrating examples of procedures of session update processes respectively performed by a device and the controller. FIG. 15 is a sequence chart illustrating an example of a procedure of the session update process that includes interaction between devices and the controller.

In the session update processes, a device and the controller 100 respectively perform mutual authentication again and update the group key, session key, and remaining session time. The processes respectively performed by a device and the controller are outlined with reference to the flowcharts in FIG. 13 and FIG. 14, and thereafter the process including interaction between devices and the controller is described in detail with reference to the sequence chart in FIG. 15.

First, the session update process performed by a device is outlined with reference to the flowchart in FIG. 13. The device performs the process by following a procedure below regardless of whether the device is the reference device or is a device other than the reference device.

A device monitors the remaining session time in order to determine whether to start a session update or waits for a session update notification from the controller (step S1210). If the remaining session time is larger than a specific value determined in advance and if no session update notification has been received from the controller (No in step S1210), the device continues monitoring.

If the remaining session time decreases to the specific value determined in advance or below or if a session update notification has been received from the controller (Yes in step S1210), the device transmits a session update request to the controller in order to perform a session update (step S1220).

The device performs the subroutine "shared-key-using mutual authentication to session-related information creation" to thereby perform mutual authentication with the controller using the shared key, thereafter create a group key and a session key, and set the session validity period, the group key, session key, and session validity period being session-related information (step S1230). The subroutine process will be described in detail below.

If the return value from the subroutine in step S1230 is "successful" (Yes in step S1240), the device registers the information related to a new session which has been created in step S1230 as session update information (step S1250).

On the other hand, if the return value from the subroutine in step S1230 is "error" (No in step S1240), the device does not perform a session update and ends the session update process.

Next, the session update process performed by the controller is outlined with reference to the flowchart in FIG. 14.

The controller waits for a session update request from a device (step S1310). If the controller has not received a session update request (No in step S1310), the controller continues waiting for a session update request from a device.

If the controller has received a session update request from a device (Yes in step S1310), the controller performs the subroutine "shared-key-using mutual authentication to session-related information creation" to thereby perform mutual authentication with the device using the shared key, thereafter create a group key and a session key, and set the session validity period, the group key, session key, and session validity period being session-related information (step S1320). The subroutine process will be described in detail below.

If the return value from the subroutine in step S1320 is "successful" (Yes in step S1330), the controller registers the information related to a new session which has been created in step S1320 as session update information (step S1340). At this time, in a case where the device is the reference device, the controller registers information indicating that devices other than the device which are connected to the controller have not performed a session update. In a case where the device is not the reference device, the controller registers information indicating that the device has performed a session update. That is, information indicating whether devices other than the reference device have performed a session update or not after a session update by the reference device is managed for each device.

On the other hand, if the return value from the subroutine in step S1320 is "error" (No in step S1330), the controller does not register session update information to thereby perform no session update for the device.

Regardless of whether a session update has been performed for the device, if another device that has not performed a session update is present (Yes in step S1350), the controller transmits a session update notification to the device that has not performed a session update (step S1360). At this time, the controller may simultaneously transmit a session update notification to all devices that have not performed a session update or may transmit a session update notification to some or one of the devices that have not performed a session update. The controller consequently transmits a session update notification to all non-updating devices and performs a session update to thereby update respective sessions with all devices, except for a device for which an error has occurred in step S1320 as a matter of course.

If the session update process has been completed for all devices (No in step S1350), the controller ends the session update process.

Hereinafter, the process including interaction between devices and the controller will be described in more detail with reference to the sequence chart in FIG. 15. Regarding the devices, it is assumed that the device 200a is the reference device and the device 200b is a device other than the reference device. The sequence chart illustrates a case where no error occurs, for example, and a process to be performed in a case where an error occurs will be described below.

The device management unit 201 of the device 200a monitors the remaining session time 1160 stored in the connecting controller management table 1100 and checks if the remaining session time is equal to or smaller than a specific threshold determined in advance. If the remaining session time is larger than the specific value, the device management unit 201 of the device 200a continues monitoring the remaining session time (step S141). The device management unit 201 of the device 200b similarly monitors the remaining session time as the device 200a does, and it is assumed that the device 200b has a remaining session time longer than that of the device 200a. Even if a device other than the reference device has a remaining session time shorter than that of the reference device and performs a session update process ahead of the reference device, there is no problem. In this case, regarding the group key, a group key used by the reference device is obtained in the subroutine "shared-key-using mutual authentication to session-related information creation" described below. That is, the same group key as that currently being used is obtained, and therefore, the group key is not updated. However, at the time when the reference device performs a session update process, the session update state of the device other than the reference device is cleared. As a result, the device is determined to be a session-non-updating device and receives a session update notification from the controller. In response to the notification, the device performs a session update so that the device updates its group key at the timing when the reference device updates its group key.

At the time when the remaining session time decreases to the specific threshold or below, the device management unit 201 of the device 200a makes the authentication processing unit 204 perform a session update. The authentication processing unit 204 first transmits a session update request to the controller 100 via the communication unit 206 (step S142).

The device management unit 101 of the controller 100 receives the session update request via the communication unit 105 and makes the authentication processing unit 103 perform a mutual authentication process. In response to this, the authentication processing unit 103 of the controller 100 and the authentication processing unit 204 of the device 200a perform mutual authentication based on challenge-response authentication using the shared key to thereby mutually confirm their validity (step S143). In a case where their validity has been mutually confirmed through mutual authentication, a group key, a session key, and a session validity period, which are session-related information, are created (step S143).

The process "shared-key-using mutual authentication to session-related information creation" in step S143 is similar to that in step S103 of the device registration process and is illustrated as a subroutine for convenience, and the procedure thereof will be described below. If the return value from the subroutine process is "error", the controller and the device 200a do not update the session. That is, the controller and the device 200a do not perform the session update information registration processes in steps S145 and S144 respectively, and the flow proceeds to step S146. In the subsequent subroutine "shared-key-using mutual authentication to session-related information creation", the device 200b is set as the reference device.

The device management unit 201 of the device 200a registers the session key, group key, and session validity period created in step S143 in the connecting controller management table 1100 included in the device information storage unit 203 (step S144). At this time, the session validity period is registered as the remaining session time item.

The device management unit 101 of the controller 100 registers the group key, session key, and session validity period created in step S143 in the connecting device management table 1000 included in the device information storage unit 102. The session validity period is registered as the item of the remaining session time 1060. At this time, the session update state 1070 of the device 200a is set to "updated". Regarding records related to devices other than the device 200a, that is, devices other than the reference device, the item of the session update state 1070 is updated to "not updated" (step S145).

The device management unit 101 of the controller 100 refers to the item of the session update state 1070 in the connecting device management table 1000 stored in the device information storage unit 102 and checks if any "not updated" device is present. In a case where a device having the item of the session update state 1070 being set to "not updated" is not present, the device management unit 101 of the controller 100 determines that a session update process has been performed for all devices and ends the process.

In a case where a device having the session update state 1070 being set to "not updated" is present, the device management unit 101 of the controller 100 transmits a session update notification to the device (step S146). In the example in FIG. 15, the device management unit 101 of the controller 100 transmits a session update notification to the device 200b that has not performed a session update. If any other device that has not performed a session update is present, the device management unit 101 of the controller 100 also transmits a session update notification to the device and thereafter performs the subsequent process. In this case, the device management unit 101 of the controller 100 may simultaneously transmit a session update notification to all devices that have not performed a session update, transmit a session update notification to one of the non-updating devices, or transmit a session update notification to every few non-updating devices.

The device management unit 201 of the device 200b accepts via the communication unit 206 the session update notification transmitted by the controller 100 and makes the authentication processing unit 204 perform a session update. The authentication processing unit 204 first transmits a session update request to the controller 100 via the communication unit 206 (step S147).

Thereafter, the device 200b, which is a device other than the reference device, performs a session update by following a procedure similar to that in steps from S143 to S145 related to the device 200a, which is the reference device (steps S148 to S150).

However, in step S149, the device management unit 101 of the controller 100 registers the group key, session key, and session validity period created in step S148 in the connecting device management table 1000 included in the device information storage unit 102 and updates the item of the session update state 1070 to "updated" (step S149).

By transmitting a session update notification to all session-non-updating devices in step S146 described above, the controller performs a session update with all devices and shares the updated group key with all devices.

PKI-based Mutual Authentication to Shared Key Creation

Figure 16:
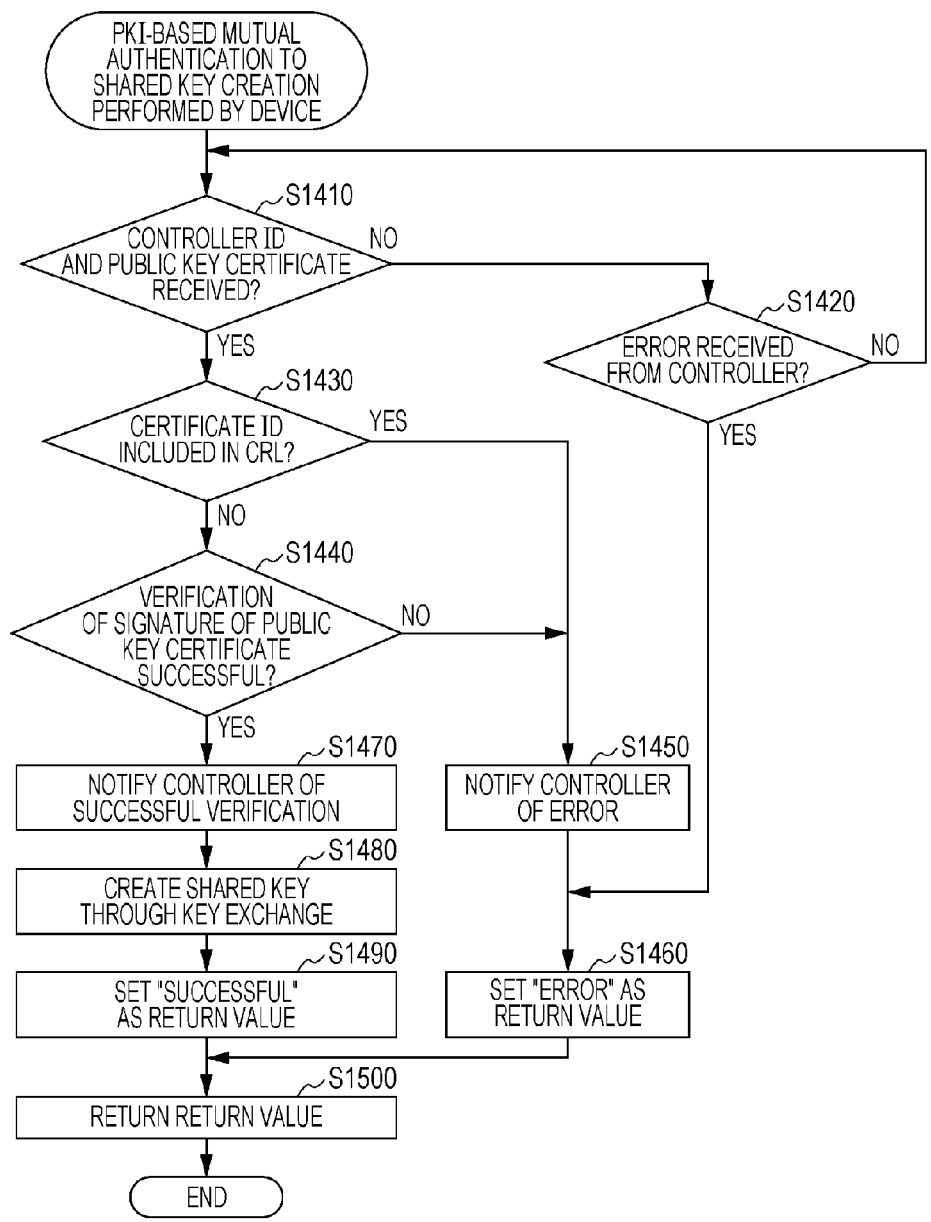
FIG. 16 is a flowchart illustrating an example of a procedure from PKI-based mutual authentication to shared key creation performed by the device.
Figure 17:
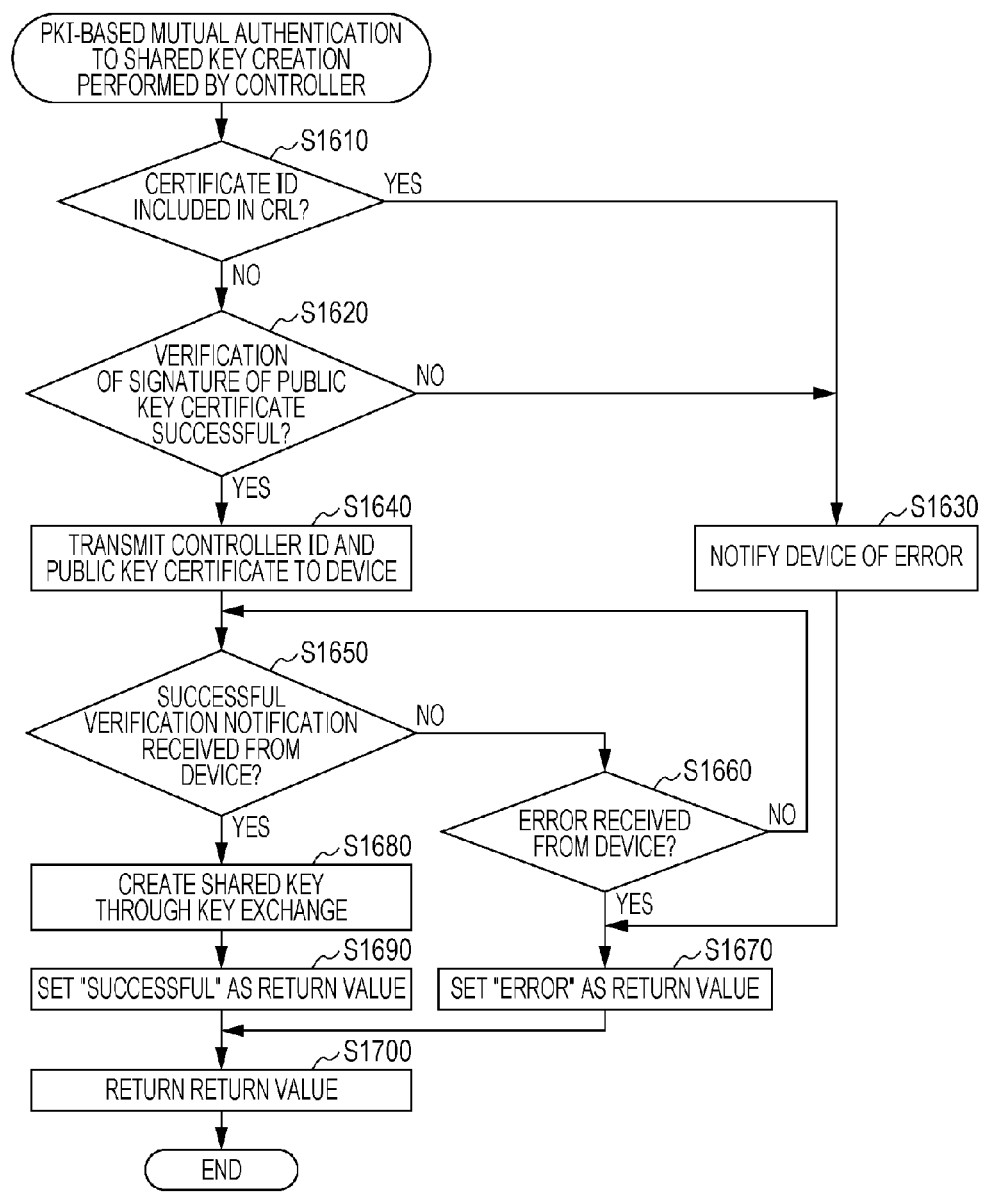
FIG. 17 is a flowchart illustrating an example of a procedure from PKI-based mutual authentication to shared key creation performed by the controller.
Figure 18:
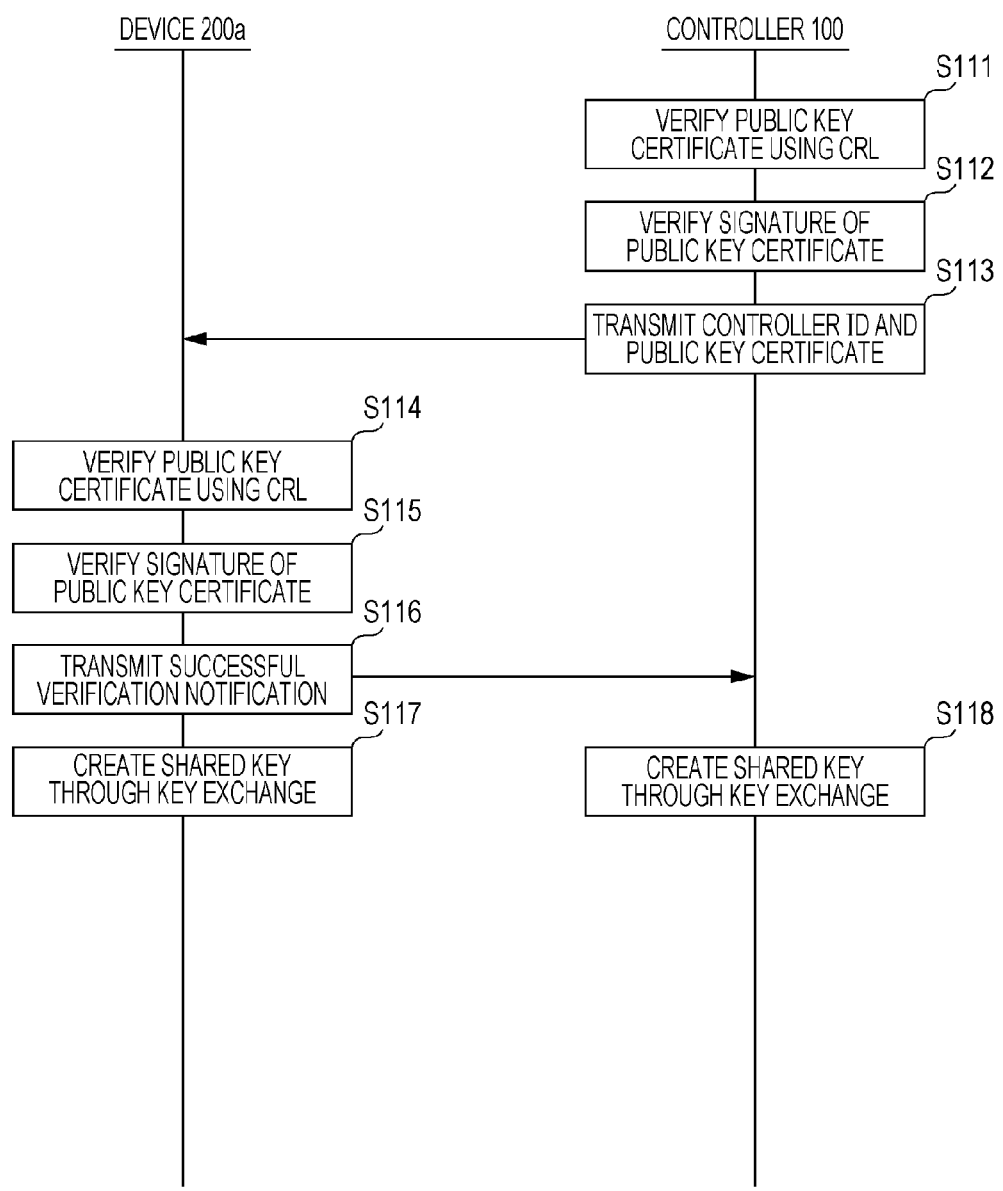
FIG. 18 is a sequence chart illustrating an example of a procedure from PKI-based mutual authentication to shared key creation.

FIG. 16 and FIG. 17 are flowcharts illustrating examples of procedures of processes from PKI-based mutual authentication to shared key creation respectively performed by a device and the controller. FIG. 18 is a sequence chart illustrating an example of a procedure of the process that includes interaction between a device and the controller. The processes respectively performed by a device and the controller are outlined with reference to the flowcharts in FIG. 16 and FIG. 17, and thereafter the process including interaction between a device and the controller is described in detail with reference to the sequence chart in FIG. 18.

First, the process performed by a device is outlined with reference to the flowchart in FIG. 16.

A device waits for the controller ID and the public key certificate from the controller. If the device has not received the controller ID or the public key certificate (No in step S1410) and has received an error (Yes in step S1420), the device sets "error" as the return value of the subroutine (step S1460).

If the device has not received the controller ID or the public key certificate and has not received an error from the controller (No in step S1410 and No in step S1420), the device continues waiting for information from the controller.

If the device has received the controller ID and the public key certificate (Yes in step S1410), the device confirms that the certificate ID of the public key certificate received from the controller is not included in the CRL (step S1430).

If the certificate ID is not included in the CRL and has not expired (No in step S1430), the device verifies a signature added to the public key certificate (step S1440).

In step S1440, if verification of the signature of the public key certificate of the controller is successful (Yes in step S1440), the device notifies the controller of successful verification (step S1470).

Thereafter, the device shares a shared key through a key exchange with the controller (step S1480). The key is used in subsequent mutual authentication. The device sets "successful" as the return value of the subroutine (step S1490).

On the other hand, if the certificate ID of the public key certificate is included in the CRL (Yes in step S1430) or if signature verification is not successful (No in step S1440), the device determines that verification of the public key certificate of the controller has failed and transmits an error notification to the controller (step S1450). The device sets "error" as the return value of the subroutine (step S1460).

The return value set in step S1490 or S1460 is returned to the process that has called the subroutine as the result of the subroutine process (step S1500).

Next, the process performed by the controller is outlined with reference to the flowchart in FIG. 17.

First, the controller confirms that the certificate ID of the public key certificate received from a device is not included in the CRL (step S1610).

If the certificate ID is not included in the CRL and has not expired (No in step S1610), the controller verifies a signature added to the public key certificate (step S1620).

If the certificate ID of the public key certificate is included in the CRL (Yes in step S1610) or if signature verification is not successful (No in step S1620), the controller determines that verification of the public key certificate of the device has failed and transmits an error notification to the device (step S1630).

The controller sets "error" as the return value of the subroutine (step S1670).

In step S1620, if verification of the signature of the public key certificate performed by the controller is successful (Yes in step S1620), the controller waits for the result of verification of the public key certificate of the controller performed by the device (step S1650).

If the controller has not received a successful verification notification from the device (No in step S1650) and has received an error notification (Yes in step S1660), the controller sets "error" as the return value of the subroutine (step S1670).

If the controller has not received a successful verification notification from the device (No in step S1650) and has not received an error from the device (No in step S1660), the controller continues waiting for the result of verification from the device.

If the controller has received a successful verification notification from the device (Yes in step S1650), the controller and the device share a shared key through a key exchange (step S1680). The key is used in subsequent mutual authentication.

The controller sets "successful" as the return value of the subroutine (step S1690).

The return value set in step S1690 or S1670 is returned to the process that has called the subroutine as the result of the subroutine process (step S1700).

Hereinafter, the details of the process including interaction between a device and the controller will be described with reference to the sequence chart in FIG. 18. Although description will be given while assuming the device 200*a* to be the device, for example, the process related to the device 200*b* and the device 200*c* is performed by following a procedure similar to that for the device 200*a* as a matter of course. The sequence chart illustrates a case where no error occurs, for example, and a process to be performed in a case where an error occurs will be described below.

The authentication processing unit 103 of the controller 100 confirms that the certificate ID of the public key certificate of the device 200*a* is not included in the CRL stored in the authentication information storage unit 104 (step S111).

In step S111, if the certificate ID related to the device 200*a* is not included in the CRL, the authentication processing unit 103 of the controller 100 verifies if an electronic signature of a certifying authority which is added to the public key certificate of the device 200*a* is valid (step S112). An electronic signature scheme and a verification method used here are based on the ECDSA (Elliptic Curve Digital Signature Algorithm). The electronic signature and the verification method based on the ECDSA use a general technique described in National Security Agency, "Suite B Implementer's Guide to FIPS 186-3 (ECDSA)", [online], Feb. 3, 2010, [searched on Jun. 24, 2014], Internet <URL: http://www.nsa.gov/ia/_files/ecdsa.pdf> and the like, and therefore, description thereof will be omitted.

If the certificate ID related to the device 200*a* is included in the CRL in step S111 or if verification of the electronic signature is not successful in step S112, the authentication processing unit 103 determines that the device 200*a* is not a valid device, transmits an error notification to the device 200*a*, and returns the return value "error" to the device registration process, which has called the subroutine. At this time, the device 200*a* that has received the error notification also returns the return value "error", and both the controller and the device end the subroutine process.

If verification of the electronic signature is successful in step S112, the authentication processing unit 103 of the controller 100 determines that the device 200*a* is a valid device and transmits the controller ID and the public key certificate of the controller to the device 200*a* via the communication unit 105 (step S113).

The device management unit 201 of the device 200*a* accepts via the communication unit 206 the controller ID and the public key certificate of the controller 100 and makes the authentication processing unit 204 perform an authentication process based on a PKI. The authentication processing unit 204 first confirms that the certificate ID of the public key certificate of the controller is not included in the CRL stored in the authentication information storage unit 205 (step S114).

In step S114, if the certificate ID related to the controller 100 is not included in the CRL, the authentication processing unit 204 of the device 200a verifies if an electronic signature of a certificating authority which is added to the public key certificate of the controller 100 is valid (step S115). An electronic signature scheme and a verification method used here are based on the ECDSA (Elliptic Curve Digital Signature Algorithm) as in step S112, and description thereof will be omitted.

If the certificate ID related to the controller is included in the CRL in step S114 or if verification of the electronic signature is not successful in step S115, the authentication processing unit 204 determines that the controller 100 is not a valid device, transmits an error notification to the controller, and returns the return value "error" to the device registration process, which has called the subroutine. At this time, the controller that has received the error notification also returns the return value "error", and both the controller and the device end the subroutine process.

If verification of the electronic signature is successful in step S115, the authentication processing unit 204 of the device 200a determines that the controller 100 is a valid device and transmits a successful verification notification to the controller 100 (step S116).

Next, the authentication processing unit 204 of the device 200a and the authentication processing unit 103 of the controller 100 perform a key exchange as a process for sharing a shared key (steps S117 and S118). A key exchange algorithm used here is based on ECDH (Elliptic Curve Diffie-Hellman), which is a key exchange algorithm using elliptic curve cryptography. ECDH uses a general technique described in Elaine Barker and three others, NIST Special Publication 800-56A Revision 2, "Recommendation for Pair-Wise Key-Establishment Schemes Using Discrete Logarithm Cryptography", [online], May 13, 2013, National Institute of Standards and Technology, [searched on Jun. 24, 2014], Internet <URL: http://nvlpubs.nist.gov/nistpubs/SpecialPublications/NIST.SP.800-56Ar2.pdf> and the like, and therefore, detailed description thereof will be omitted.

In the key exchange based on ECDH, the authentication processing unit 103 of the controller 100 calculates a value by using the private key of the controller and the public key of the device 200a which is included in the public key certificate of the device 200a and performing a predetermined procedure. The authentication processing unit 204 of the device 200a calculates a value by using the private key of the device and the public key of the controller 100 which is included in the public key certificate of the controller 100 and performing a predetermined procedure. Here the resulting values respectively calculated by the controller 100 and the device 200a are the same. A shared key is calculated from the values thus shared. In this embodiment, a key length of 128 bits based on AES (Advanced Encryption Standard) is employed for a shared key, a hash value is calculated from the values thus shared, and the most significant 128 bits of the calculated hash value are used as a shared key.

Shared-Key-Using Mutual Authentication to Session-related Information Creation

Figure 19:
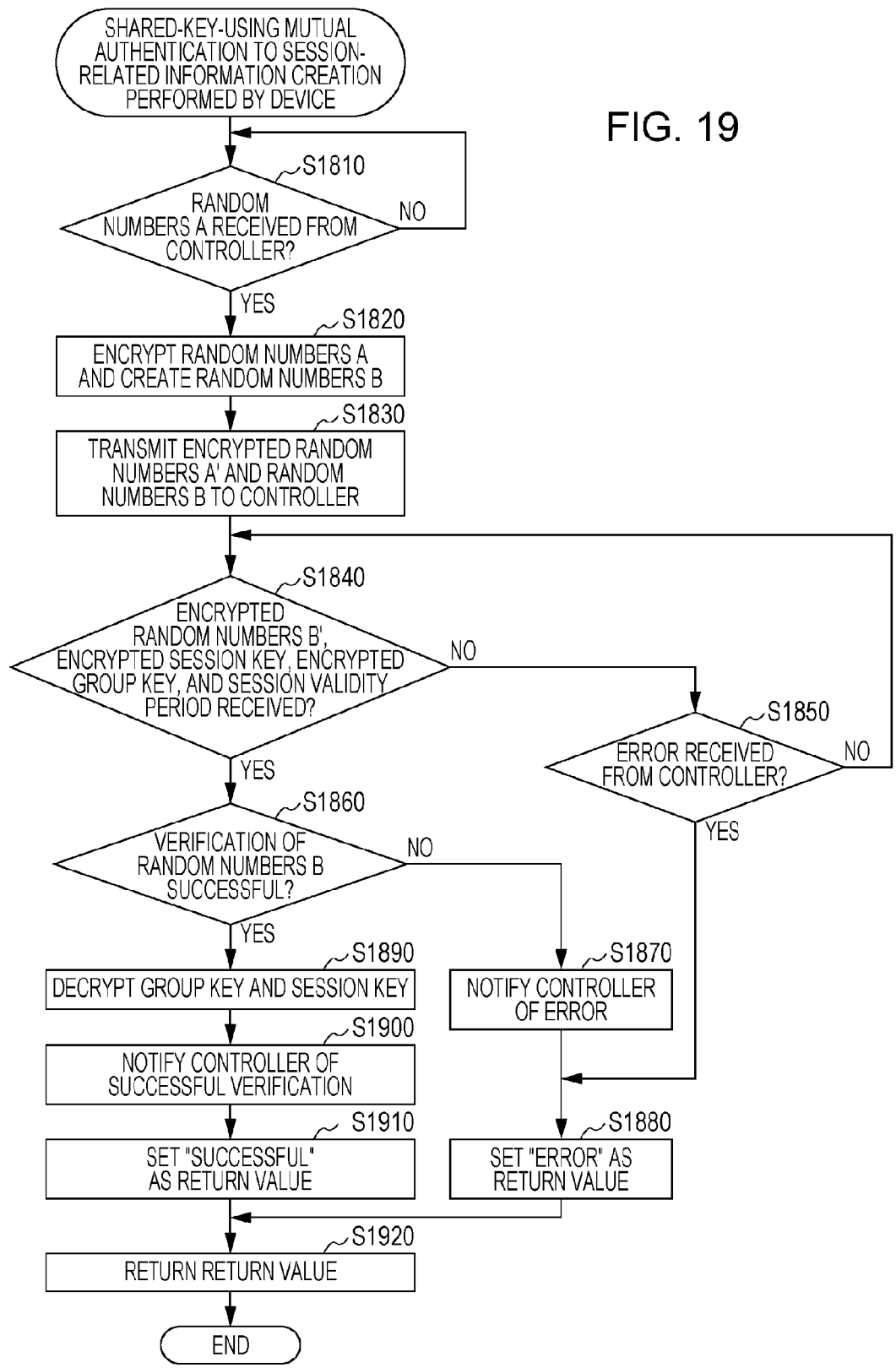
FIG. 19 is a flowchart illustrating an example of a procedure from shared-key-using mutual authentication to session-related information creation performed by the device.
Figure 20:
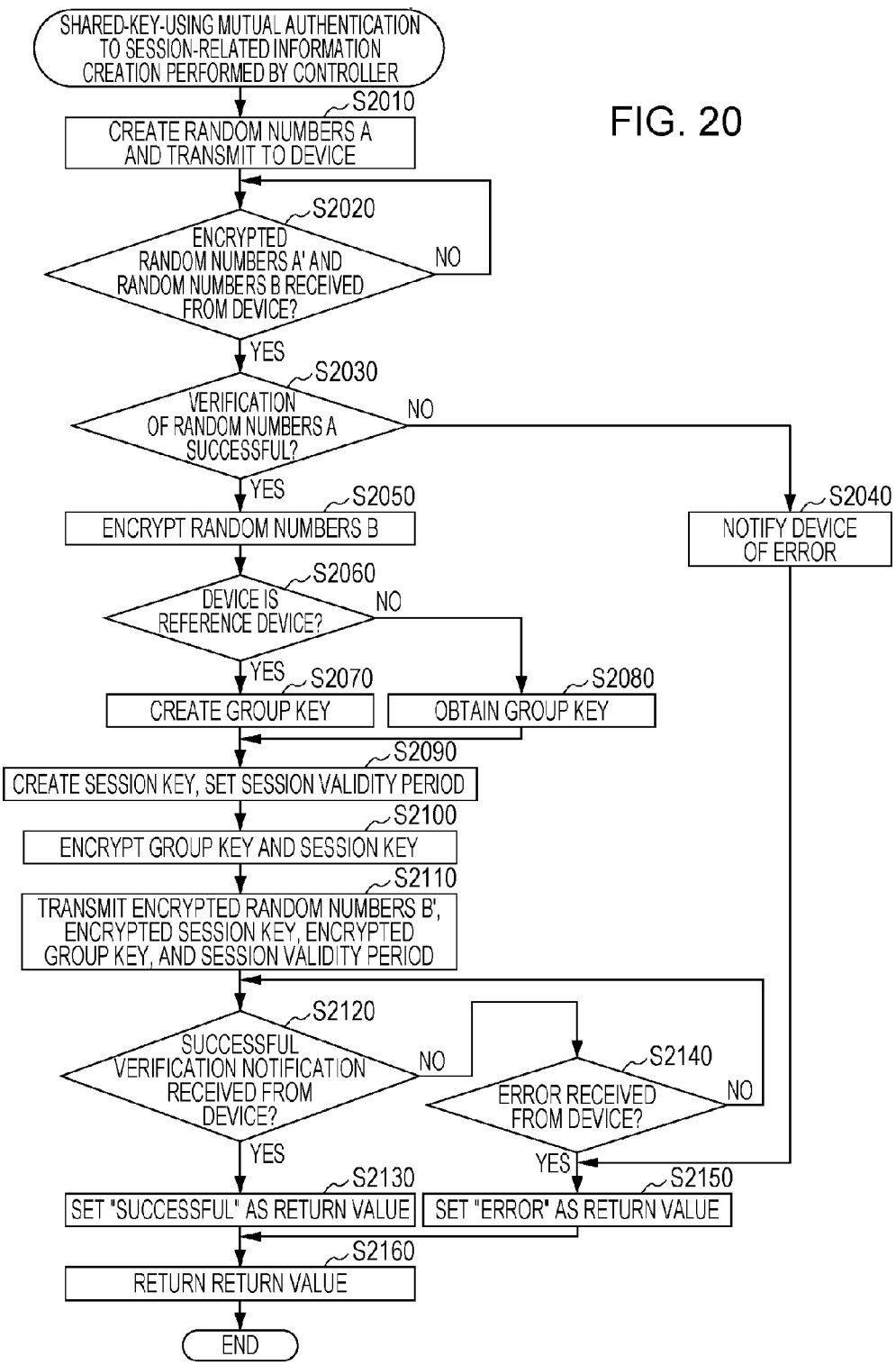
FIG. 20 is a flowchart illustrating an example of a procedure from shared-key-using mutual authentication to session-related information creation performed by the controller.
Figure 21:
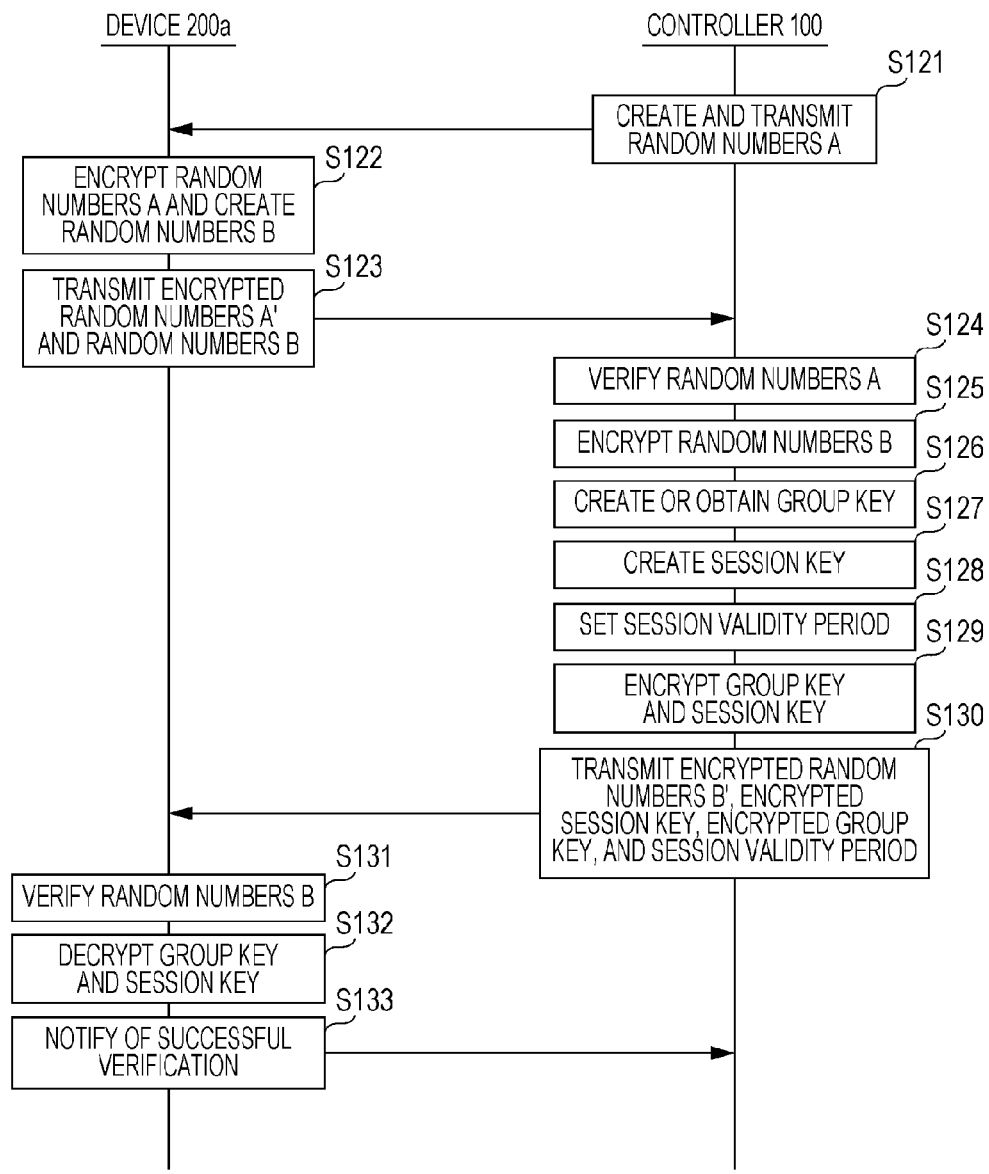
FIG. 21 is a sequence chart illustrating an example of a procedure from shared-key-using mutual authentication to session-related information creation.

FIG. 19 and FIG. 20 are flowcharts illustrating examples of procedures of processes from shared-key-using mutual authentication to session-related information creation respectively performed by a device and the controller. FIG. 21 is a sequence chart illustrating an example of a procedure of the process that includes interaction between a device and the controller.

In this embodiment, as mutual authentication using a shared key, challenge-response authentication using random numbers is performed.

The processes respectively performed by a device and the controller are outlined with reference to the flowcharts in FIG. 19 and FIG. 20, and thereafter the process including interaction between a device and the controller is described in detail with reference to the sequence chart in FIG. 21.

First, the process from shared-key-using mutual authentication to session-related information creation performed by a device is outlined with reference to the flowchart in FIG. 19.

A device waits for random numbers A created by the controller to be received from the controller. If the device has not received the random numbers A (No in step S1810), the device continues waiting.

If the device has received the random numbers A (Yes in step S1810), the device encrypts the received random numbers A and creates random numbers B, which are different from the random numbers A (step S1820).

The device transmits encrypted random numbers A', which are the encrypted random numbers A, and the random numbers B to the controller (step S1830).

Thereafter, the device waits for the controller to perform processing. If the device has not received encrypted random numbers B', an encrypted session key, an encrypted group key, or a session validity period from the controller (No in step S1840) and has received an error from the controller (Yes in step S1850), the device sets "error" as the return value of the subroutine (step S1880).

If the device has not received the encrypted random numbers B', the encrypted session key, the encrypted group key, or the session validity period from the controller (No in step S1840) and has not received an error from the controller (No in step S1850), the device continues waiting for any of the pieces of information to be received from the controller.

If the device has received the encrypted random numbers B', the encrypted session key, the encrypted group key, and the session validity period from the controller (Yes in step S1840), the device first performs verification of the random numbers B (step S1860). The device decrypts the received encrypted random numbers B' using the shared key retained by the device. If the value obtained as a result of decryption matches the random numbers B created by the device in step S1820, the device determines that verification of the random numbers B is successful.

If verification of the random numbers B is not successful (No in step S1860), the device notifies the controller of the error (step S1870).

The device sets "error" as the return value of the subroutine (step S1880).

If verification of the random numbers B is successful (Yes in step S1860), the device decrypts the group key and session key received from the controller (step S1890).

The device notifies the controller of successful verification (step S1900).

The device sets "successful" as the return value of the subroutine (step S1910).

The return value set in step S1910 or S1880 is returned to the process that has called the subroutine as the result of the subroutine process (step S1920).

Next, the process from shared-key-using mutual authentication to session-related information creation performed by the controller is outlined with reference to the flowchart in FIG. 20.

The controller creates random numbers A and transmits the random numbers A to a device (step S2010).

The controller waits for encrypted random numbers A' and random numbers B created by the device performing processing. If the controller has not received the encrypted random numbers A' or the random numbers B from the device (No in step S2020), the controller continues waiting until the controller receives the encrypted random numbers A' and the random numbers B.

If the controller has received the encrypted random numbers A' and the random numbers B (Yes in step S2020), the controller performs verification of the random numbers A (step S2030). The controller decrypts the received encrypted random numbers A' using the shared key retained by the controller. If the value obtained as a result of decryption matches the random numbers A created by the controller in step S2010, the controller determines that verification of the random numbers A is successful.

If verification of the random numbers A is not successful (No in step S2030), the controller notifies the device of the error (step S2040). The controller sets "error" as the return value of the subroutine (step S2150).

If verification of the random numbers A is successful (Yes in step S2030), the controller encrypts the random numbers B received from the device (step S2050).

The controller checks if the device is the reference device (step S2060). In a case where the device is a first device that makes a connection request to the controller or in a case where a connection with a device that is the reference device is lost, for example, and the reference device is not set, the device is assumed to be the reference device.

If the device is the reference device (Yes in step S2060), the controller creates a group key (step S2070). On the other hand, if the device is not the reference device (No in step S2060), in order to share the group key created and retained by the controller also with the device, the controller obtains data about the group key (step S2080).

The controller creates a session key and sets the session validity period (step S2090).

The controller encrypts the group key and the session key using the shared key (step S2100).

Thereafter, the controller transmits the encrypted random numbers B', the encrypted session key, the encrypted group key, and the session validity period obtained as a result of the process in steps from S2050 to S2100 to the device (step S2110).

The controller waits for the result of verification performed by the device. If the controller has not received a successful verification notification (No in step S2120) and has received an error (Yes in step S2140), the controller sets "error" as the return value of the subroutine (step S2150).

If the controller has not received a successful verification notification from the device (No in step S2120) and has not received an error from the device (No in step S2140), the controller continues waiting for a result from the device.

If the controller has received a successful verification notification from the device (Yes in step S2120), the controller sets "successful" as the return value of the subroutine (step S2130).

The return value set in step S2130 or S2150 is returned to the process that has called the subroutine (step S2160).

Hereinafter, the details of the process including interaction between a device and the controller will be described with reference to the sequence chart in FIG. 21. Although description will be given while assuming the device 200a to be the device, the process related to the device 200b and the device 200c is performed by following a procedure similar to that for the device 200a as a matter of course. The sequence chart illustrates a case where no error occurs, for example, and a process to be performed in a case where an error occurs will be described below.

First, the authentication processing unit 103 of the controller 100 creates any random numbers A and transmits the random numbers A to the device 200a (step S121).

The authentication processing unit 204 of the device 200a encrypts the random numbers A received via the communication unit 206 using the shared key retained by the device 200a and creates encrypted random numbers A' (step S122). The authentication processing unit 204 creates any random numbers B (step S122).

The authentication processing unit 204 of the device 200a transmits the encrypted random numbers A' encrypted in step S122 and the random numbers B to the controller 100 (step S123).

The authentication processing unit 103 of the controller 100 receives the encrypted random numbers A' and the random numbers B. The authentication processing unit 103 decrypts the encrypted random numbers A' using the shared key. If the value obtained as a result of decryption matches the random numbers A created by the controller in step S121, the authentication processing unit 103 determines that verification of the random numbers A is successful (step S124).

In step S124, if verification of the random numbers A is not successful, the authentication processing unit 103 of the controller transmits an error notification to the device and returns the return value "error" to the process that has called the subroutine. At this time, the device that has received the error notification also returns the return value "error", and both the controller and the device end the subroutine process.

In step S124, if verification of the random numbers A is successful, the authentication processing unit 103 of the controller encrypts the random numbers B received from the device 200a using the shared key and creates encrypted random numbers B' (step S125).

Subsequently, the authentication processing unit 103 of the controller refers to the item of the reference device 1080 in the connecting device management table 1000 in the device information storage unit 102 and checks if the device 200a is the reference device. If the device 200a is the reference device, the authentication processing unit 103 creates a group key (step S126). The group key has a key length of 128 bits based on AES and is created by using any general technique, and therefore, description of creation will be omitted. In a case where the device 200a is a first device that makes a connection request to the controller or in a case where a connection with a device that is the reference device is lost, for example, and the reference device is not set, the authentication processing unit 103 sets the device 200a as the reference device and creates a group key.

On the other hand, in a case where the authentication processing unit 103 refers to the connecting device management table 1000 and confirms that the device 200a is not the reference device, the authentication processing unit 103 obtains, from the connecting device management table 1000 stored in the device information storage unit 102, information about the group key that has been created.

The authentication processing unit 103 of the controller creates a session key (step S127). The session key is similar to the group key, that is, has a key length of 128 bits based on AES, and is created by using any general technique.

Subsequently, the authentication processing unit 103 of the controller sets the session validity period (step S128). At this time, the authentication processing unit 103 sets a specific value determined in advance (24 hours or 72 hours, for example) as the session validity period.

The authentication processing unit 103 of the controller encrypts information about the group key and session key respectively obtained in steps S126 and S127 by using the shared key (step S129).

The authentication processing unit 103 transmits the encrypted random numbers B' encrypted in step S125, the encrypted group key and encrypted session key encrypted in step S129, and the session validity period set in step S128 to the device 200a via the communication unit 105 (step S130).

The authentication processing unit 204 of the device 200a verifies the encrypted random numbers B' received from the controller 100 (step S131). The authentication processing unit 204 decrypts the encrypted random numbers B' using the shared key retained by the device 200a. If the value obtained as a result of decryption matches the random numbers B created by the device 200a in step S122, the authentication processing unit 204 determines that verification of the random numbers B is successful.

In step S131, if verification of the random numbers B is not successful, the authentication processing unit 204 determines that the controller 100 is not a valid controller, transmits an error notification to the controller 100, and returns the return value "error" to the process that has called the subroutine. At this time, the controller that has received the error notification also returns the return value "error", and both the controller and the device end the subroutine process.

In step S131, if verification of the random numbers B is successful, the authentication processing unit 204 of the device 200a decrypts the encrypted group key and the encrypted session key using the shared key (step S132).

The authentication processing unit 204 of the device 200a notifies the controller 100 of successful verification (step S133).

Device History Information Transmission Process

Figure 22:
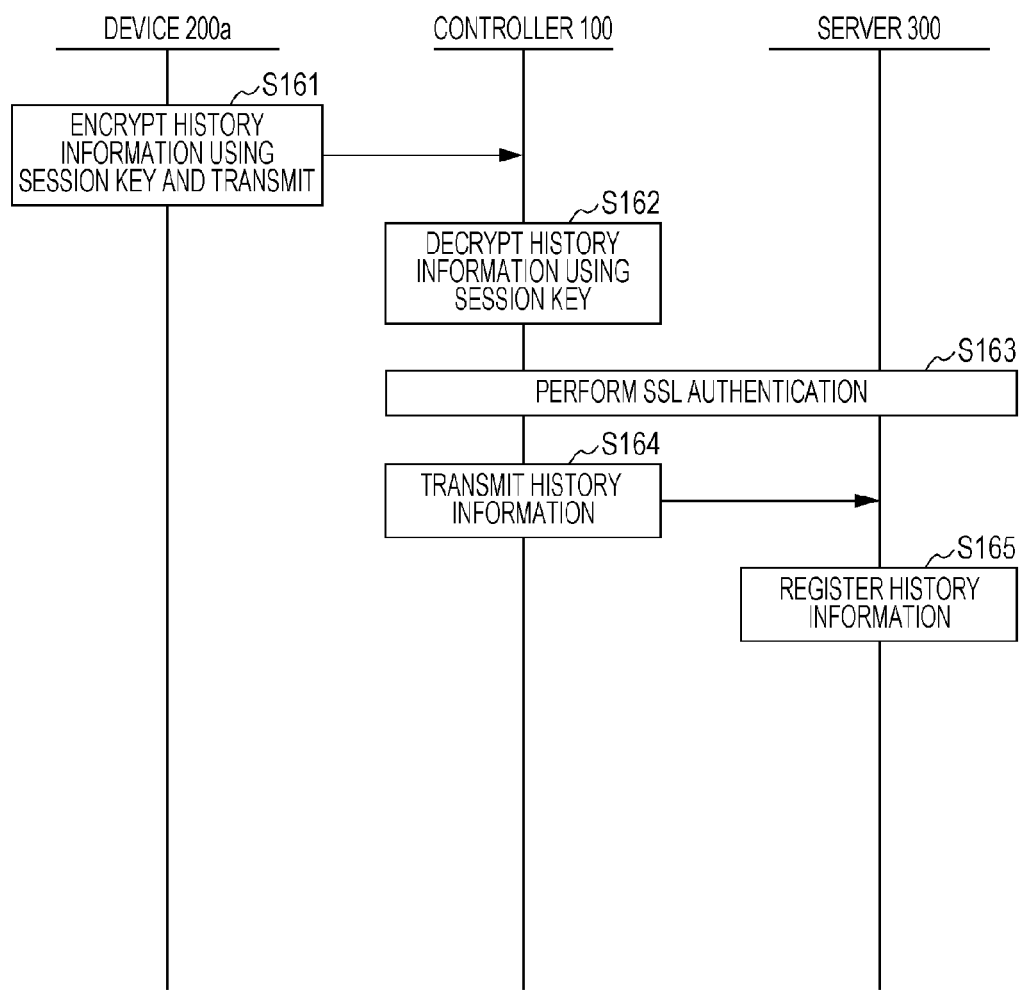
FIG. 22 is a sequence chart illustrating an example of a procedure of a device history information transmission process.

FIG. 22 is a sequence chart illustrating an example of a procedure for transmitting device history information from the device 200a to the server 300. Such transmission of device history information is performed at regular or irregular intervals. Although the procedure related to the device 200a will be described below, for example, the procedure of the process related to the device 200b and the device 200c is similar to that related to the device 200a.

The device management unit 201 of the device encrypts device history information accumulated in the device history storage unit 202 using the session key and transmits the result to the controller 100 together with the device ID of the device (step S161).

The device management unit 101 of the controller 100 receives the device ID and the encrypted device history information via the communication unit 105. The device management unit 101 of the controller 100 obtains the session key associated with the device ID from the connecting device management table 1000 included in the device information storage unit 102 and decrypts the received device history information (step S162).

The communication unit 105 of the controller 100 and the communication unit 305 of the server 300 perform SSL authentication and establish an encrypted communication channel (step S163). Here, SSL authentication is performed using a general technique, and therefore, description thereof will be omitted.

The device management unit 101 of the controller 100 transmits the controller ID of the controller, the device ID received from the device, and the decrypted device history information to the server 300 via the communication unit 105 (step S164).

The device information management unit 301 of the server 300 registers the controller ID, the device ID, and the device history information received via the communication unit 305 in the device information management table 1300 included in the device information storage unit 302 (step S165).

Control Information Transmission Process

Figure 23:
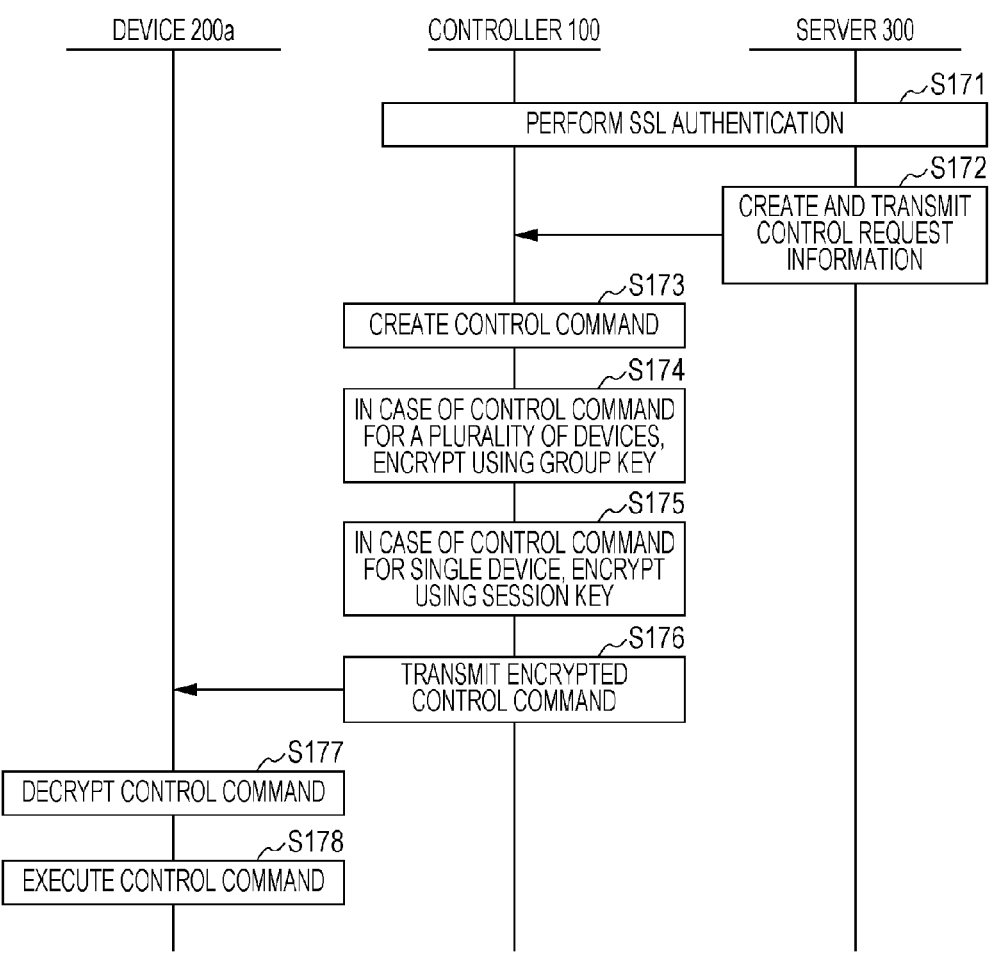
FIG. 23 is a sequence chart illustrating an example of a procedure of a control information transmission process.

FIG. 23 is a sequence chart illustrating an example of a procedure for the server 300 to control the device 200a. The server 300 transmits control request information for controlling the device 200a to the controller 100. The controller 100 that has accepted the control request creates and transmits a control command to the device 200a and makes the device 200a execute a function corresponding to the control request. Such a control request from the server 300 to the device 200a is made at regular or irregular intervals. The control request includes a function to be executed by the device, content to be displayed on a display, and so on, for example.

Although the procedure related to the device 200a will be described below, for example, the procedure of the process related to the device 200b and the device 200c is similar to that related to the device 200a.

The communication unit 305 of the server 300 and the communication unit 105 of the controller 100 perform SSL authentication and establish an encrypted communication channel (step S171).

The device information management unit 301 of the server 300 creates control request information for making the device 200a perform a certain operation and transmits the control request information to the controller 100 via the communication unit 305 (step S172).

The device management unit 101 of the controller 100 receives the control request information via the communication unit 105. The device management unit 101 checks the control request information to determine what control request is made to which device in the network, and creates a control command for execution by the device 200a in accordance with the control request (step S173).

In a case where the control command created in step S173 is an instruction given to a plurality of devices, the device management unit 101 of the controller 100 encrypts the control command using the group key (step S174). At this time, the device management unit 101 of the controller 100 may add information indicating that encryption using the group key has been performed to the header portion of the control command to be transmitted.

In a case where the control command created in step S173 is an instruction given to a single device, the device management unit 101 of the controller 100 encrypts the control command using the session key (step S175). At this time, the device management unit 101 of the controller 100 may add information indicating that encryption using the session key has been performed to the header portion of the control command to be transmitted.

The communication unit 105 of the controller 100 transmits the control command encrypted using the group key or the session key to the target device or devices (step S176).

The device 200a receives the encrypted control command via the communication unit 206 and decrypts the control command using the group key or the session key (step S177). At this time, determination as to whether decryption is to be performed using the group key or the session key may be performed by using the information added to the header portion in step S174 or S175. Alternatively, the device 200a may decrypt the control command by using each of the group key and the session key and perform determination on the basis of the result of the decryption. For example, the controller 100 adds a MAC (Message Authentication Code) value to the encrypted control command to be transmitted. The device decrypts the encrypted control command that has been received using each of the group key and the session key. The device calculates MAC values from the decrypted control commands respectively and determines which key has been used to calculate a MAC value that matches the MAC value received from the controller. The device determines that a decryption result that corresponds to the matching MAC value is a correct control command.

The device performs an operation in accordance with the instruction of the decrypted control command (step S178).

1.4 Conclusion

In this embodiment, a device among a plurality of devices connected to the controller is set as the reference device, and the controller sends an update notification to devices other than the reference device at the timing of a group key update by the reference device to thereby make the other devices update their group keys. Accordingly, it is possible to make the plurality of devices connected to the controller update their group keys at the same timing, and even if the controller and the devices perform mutual authentication and a group key update, the controller can simultaneously transmit encrypted information to the devices.

In mutual authentication between the controller and a device, two types of procedures are employed. In a case of making a connection between the controller and a device, mutual authentication using a public key certificate based on a PKI is performed. In a case of subsequent session update processing, mutual authentication using a shared key is performed. In general, mutual authentication using a shared key involves a lower processing load compared to mutual authentication based on a PKI. Accordingly, by employing a procedure using a shared key as a mutual authentication process to be performed upon a session update, a processing load related to mutual authentication can be reduced.

2. Second Embodiment

2-1. Overview

An authentication system according to this embodiment is different in that the controller sets the remaining session times for respective devices so that the remaining session times that are set at the same time point have the same value.

Hereinafter, any constituent element similar to that in the first embodiment is assigned the same reference numeral for convenience of description. Description of any constituent element similar to that in the first embodiment will be omitted, and description focusing on differences will be given.

2-2. Configurations

The configurations of an authentication system, a controller, devices, and a server in this embodiment are similar to the configurations of the authentication system 10, the controller 100, the devices 200a to 200c, and the server 300 in the first embodiment respectively. However, the connecting device management table stored in the device information storage unit 102 of the controller 100 has a data structure partially different from that in the first embodiment.

FIG. 24 is a diagram illustrating an example of a data structure and data of a connecting device management table 2000 in this embodiment.

The connecting device management table 2000 includes a group of connecting device management records, which are data for respective connected devices. Each record includes items, namely, a device ID 2010, a certificate ID 2020, a shared key 2030, a group key 2040, a session key 2050, a remaining session time 2060, a session update state 2070, and a reference device 2080. A difference from the first embodiment is that a common value is set as the remaining session time 2060 for devices having the same group key 2040. For example, in FIG. 24, the device ID1 and the device ID2 retain the same group key "11223 . . . ", and therefore, also have the same value "13:40:50" as the remaining session time.

2-3. Operations

In this embodiment, the authentication system 10 performs "device registration process", "session update process", "PKI-based mutual authentication to shared key creation", "shared-key-using mutual authentication to session-related information creation", "device history information transmission process", and "control information transmission process" as in the first embodiment. The procedure of "shared-key-using mutual authentication to session-related information creation" is described first, and the other processes are described one by one while differences from the first embodiment are focused.

Shared-Key-Using Mutual Authentication to Session-related Information Creation

The controller and a device perform mutual authentication using the shared key and create session-related information, namely, a group key, a session key, and a session validity period by performing the process from step S121 to step S133 in the sequence chart in FIG. 21 as in the first embodiment.

However, the controller 100 sets the session validity period in step S128 in a manner different from that in the first embodiment.

In this embodiment, the authentication processing unit 103 of the controller 100 sets a specific value determined in advance (24 hours or 72 hours, for example) as the session validity period in a case where the device is the reference device. However, in a case where the device is not the reference device, the authentication processing unit 103 of the controller 100 sets the session validity period as follows (step S128).

The authentication processing unit 103 of the controller 100 refers to the remaining session time 2060 in the connecting device management table 2000 included in the device information storage unit 102 and obtains the remaining session time of the reference device. The authentication processing unit 103 of the controller 100 sets the obtained value as the remaining session time of the device.

Description is given while referring to data in the connecting device management table 2000 illustrated in FIG. 24, for example. In a case of setting the session validity period of the device having device ID2, which is not the reference device, the authentication processing unit 103 of the controller 100 obtains the remaining session time of the device ID1, which is the reference device, from the connecting device management table 2000 and sets the obtained value as the session validity period of the device ID2.

As described above, by setting the session validity period of a device that is not the reference device to the remaining session period of the reference device at the time of setting the session validity period, the reference device and the device other than the reference device consequently have remaining session times that are approximately the same.

Device Registration Process

The controller and a device perform the processes of making a connection request, PKI-based mutual authentication to shared key creation, shared-key-using mutual authentication to session-related information creation, and registration of the controller and device by performing the process from step S101 to step S107 in the sequence chart in FIG. 12 as in the first embodiment.

As described in the above-described procedure "shared-key-using mutual authentication to session-related information creation", the remaining session time of the reference device is set as the session validity period of a device other than the reference device in step S103.

In step S104, regarding the session validity period that is registered by the device, the session validity period received from the controller 100 is registered as the remaining session time regardless of whether the device is the reference device or not, as in the first embodiment.

In step S106, when the controller performs device registration of a device that is not the reference device, the controller may register the item of the remaining session time by sharing the remaining session time of the reference device or may register the session validity period set in step S103 as the remaining session time. In a case of registration using any of the manners described above, the process in steps S104 and S106 in the sequence chart in FIG. 12 is performed immediately after the process in step S103 in the sequence chart in FIG. 12. Consequently, the remaining session times related to the reference device and a device other than the reference device set in the connecting device management table 2000 of the controller 100 has approximately the same value as that of the remaining session time set in the connecting device management table 1100 of the device.

Session Update Process

Figure 25:
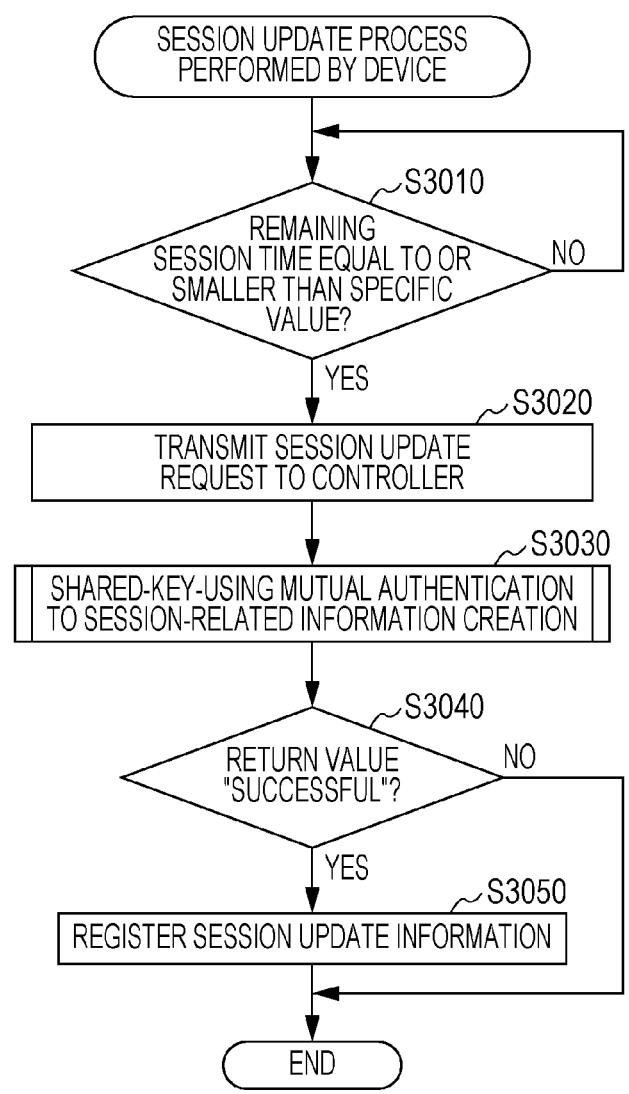
FIG. 25 is a flowchart illustrating an example of a procedure of a session update process performed by the device according to the second embodiment.
Figure 26:
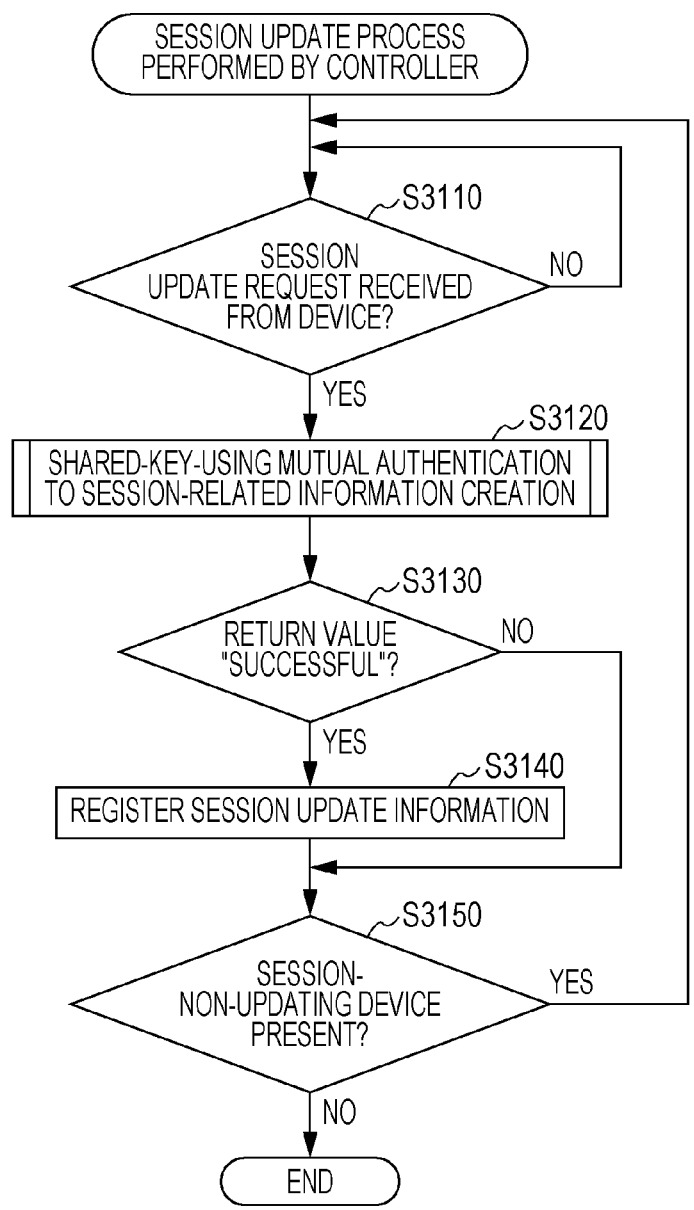
FIG. 26 is a flowchart illustrating an example of a procedure of a session update process performed by the controller according to the second embodiment.
Figure 27:
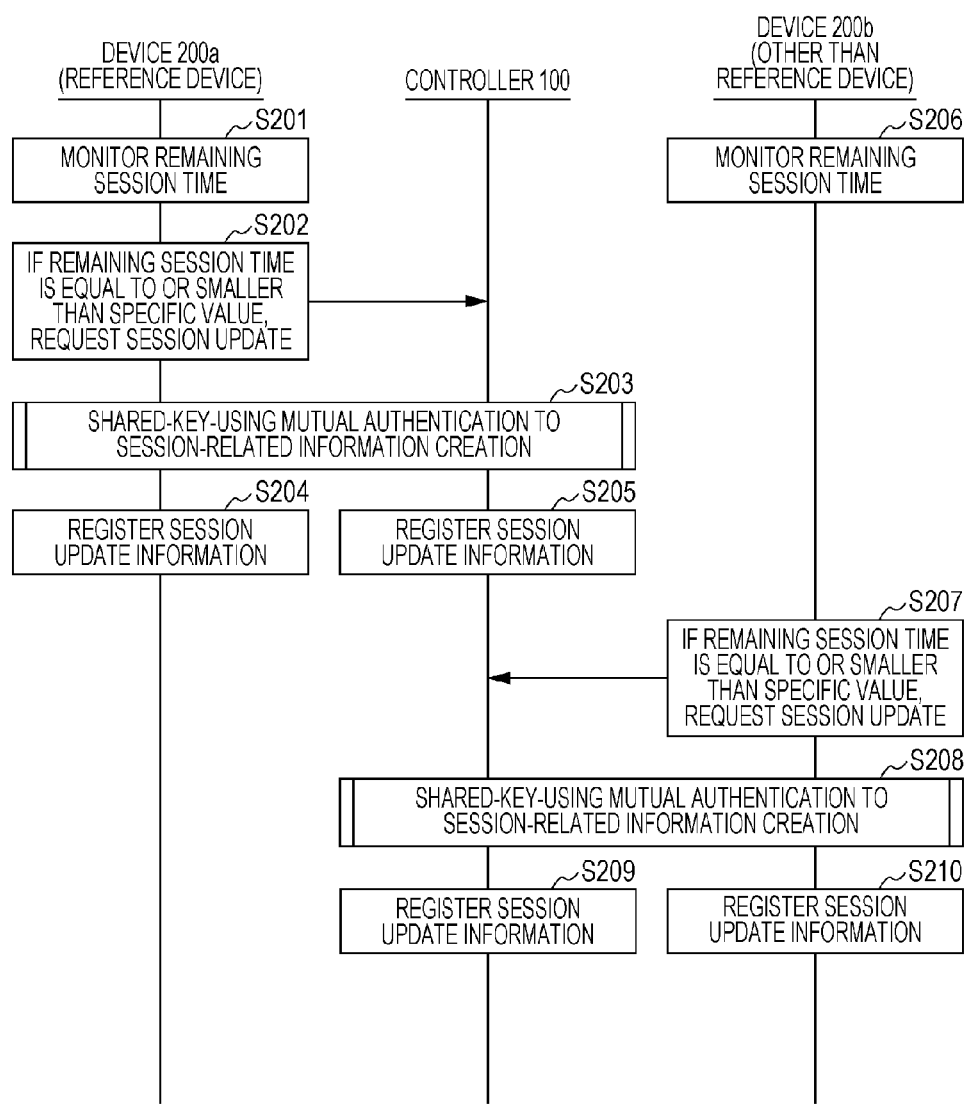
FIG. 27 is a sequence chart illustrating an example of a procedure of a session update process according to the second embodiment.

FIG. 25 and FIG. 26 are flowcharts illustrating examples of procedures of session update processes respectively performed by a device and the controller in this embodiment. FIG. 27 is a sequence chart illustrating an example of a procedure of the session update process that includes interaction between a device and the controller.

The processes respectively performed by a device and the controller are outlined with reference to the flowcharts in FIG. 25 and FIG. 26, and thereafter the process including interaction between a device and the controller is described in detail with reference to the sequence chart in FIG. 27.

First, the session update process performed by a device is outlined with reference to the flowchart in FIG. 25.

A device monitors the remaining session time set with the controller and determines whether the remaining session time is equal to or smaller than a specific value determined in advance (step S3010). If the remaining session time is larger than the specific value (No in step S3010), the device continues monitoring.

If the remaining session time is smaller than the specific value determined in advance (Yes in step S3010), the device transmits a session update request to the controller in order to perform a session update (step S3020).

The device performs the subroutine "shared-key-using mutual authentication to session-related information creation" to thereby perform mutual authentication with the controller using the shared key, thereafter create a group key and a session key, and set the session validity period, the group key, session key, and session validity period being session-related information (step S3030).

If the return value from the subroutine in step S3030 is "successful" (Yes in step S3040), the device registers the information related to a new session which has been created in step S3030 as session update information (step S3050).

On the other hand, if the return value from the subroutine in step S3030 is "error" (No in step S3040), the device does not perform a session update and ends the session update process.

Next, the session update process performed by the controller is outlined with reference to the flowchart in FIG. 26.

The controller waits for a session update request from a device (step S3110). If the controller has not received a session update request (No in step S3110), the controller continues waiting for a session update request from a device.

If the controller has received a session update request from a device (Yes in step S3110), the controller performs the subroutine "shared-key-using mutual authentication to session-related information creation" to thereby perform mutual authentication with the device using the shared key and thereafter set the group key, session key, and session validity period, which are session-related information (step S3120).

If the return value from the subroutine in step S3120 is "successful" (Yes in step S3130), the controller registers the information related to a new session which has been created in step S3120 as session update information (step S3140).

On the other hand, if the return value from the subroutine in step S3120 is "error" (No in step S3130), the controller does not perform a session update for the device that is performing a session update.

If another device that has not performed a session update is present (Yes in step S3150), the flow returns to the first step, and the controller waits for a session update request from the device that has not performed a session update (step S3110).

If the session update process has been completed for all devices (No in step S3150), the controller ends the session update process.

Hereinafter, the process including interaction between devices and the controller will be described with reference to the sequence chart in FIG. 27 while differences from the first embodiment are focused. Regarding the devices, it is assumed that the device 200a is the reference device and the device 200b is a device other than the reference device, for example.

The device management unit 201 of a device instructs the authentication processing unit 204 to perform a session update at the time when the remaining session time decreases to a specific threshold or below. The authentication processing unit 204 that accepts the instruction transmits a session update request to the controller 100 via the communication unit 206 (steps S202 and S207).

Here, in this embodiment, a device other than the reference device has a remaining session time that is approximately the same as the remaining session time of the reference device. Therefore, the process in step S202 and the process in step S207 are performed at the approximately the same timing, and the controller consequently performs a group key update with the respective devices at approximately the same timings.

The processes "PKI-based mutual authentication to shared key creation", "device history information transmission process", and "control information transmission process" are similar to those in the first embodiment, and therefore, description thereof will be omitted.

2-4. Conclusion

In the authentication system according to this embodiment, by setting the session validity period of a device other than the reference device on the basis of the remaining session time of the reference device at the time of setting the session validity period, the reference device and a device other than the reference device consequently have remaining session times that are approximately the same. Accordingly, the devices perform a session update process on the basis of the remaining session times and consequently perform a group key update at approximately the same timings respectively. As a result, even if the controller and the devices perform mutual authentication and a group key update, the controller can simultaneously transmit encrypted information to the devices.

3. Third Embodiment

3-1. Overview

An authentication system according to this embodiment is different in that the controller and the devices each have two types of group keys, namely, a group key that is currently used and a group key that is used after an update.

Hereinafter, any constituent element similar to that in the above-described embodiments is assigned the same reference numeral for convenience of description. Further, description of any constituent element similar to that in the above-described embodiments will be omitted, and description focusing on differences will be given.

3-2. Configurations

The configurations of an authentication system, a controller, devices, and a server in this embodiment are similar to the configurations of the authentication system 10, the controller 100, the devices 200a to 200c, and the server 300 in the second embodiment respectively. However, the connecting device management table stored in the device information storage unit 102 of the controller 100 has a data structure partially different from that in the above-described embodiments, and the connecting controller management table stored in the device information storage unit 203 of the device also has a data structure partially different from that in the above-described embodiments.

FIG. 28 is a diagram illustrating an example of a data structure and data of a connecting device management table 3000 included in the device information storage unit 102 of the controller 100 in this embodiment.

The connecting device management table 3000 includes a group of connecting device management records, which are data for respective connected devices. Each record includes items, namely, a device ID 3010, a certificate ID 3020, a shared key 3030, a group key (current) 3040, a group key (new) 3050, a session key 3060, a remaining session time 3070, a session update state 3080, and a reference device 3090. For the group key, two items of the group key (current) and the group key (new) are provided.

Figure 29:
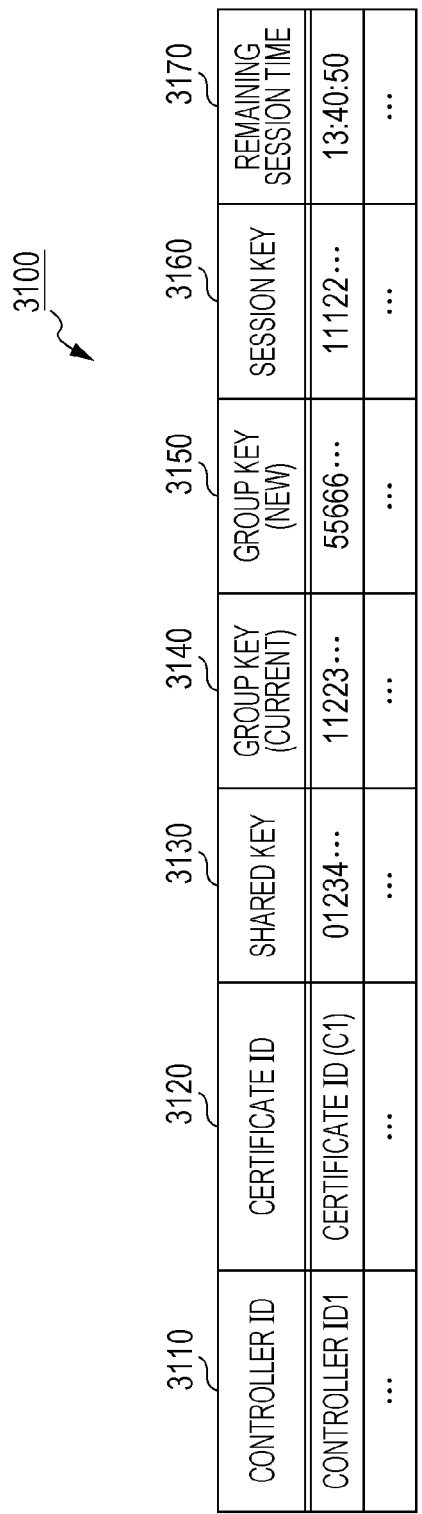
FIG. 29 is a diagram illustrating an example of a data structure and data of a connecting controller management table according to the third embodiment.

FIG. 29 is a diagram illustrating an example of a data structure and data of a connecting controller management table 3100 included in the device information storage unit 203 of the device in this embodiment.

The connecting controller management table 3100 includes a group of connecting controller management records, which are data for respective connected controllers. Each record includes items, namely, a controller ID 3110, a certificate ID 3120, a shared key 3130, a group key (current) 3140, a group key (new) 3150, a session key 3160, and a remaining session time 3170. For the group key, two items of the group key (current) and the group key (new) are provided as in the connecting device management table 3000.

Here, information to be simultaneously transmitted to the devices by the controller is encrypted by using the encryption key that is retained by the controller and the devices as the group key (current). The group key (new) is an item for retaining a group key newly created in a session update process performed by the controller and the reference device.

3-3. Operations

In this embodiment, the authentication system 10 performs "device registration process", "session update process", "PKI-based mutual authentication to shared key creation", "shared-key-using mutual authentication to session-related information creation", "device history information transmission process", and "control information transmission process" as in the second embodiment.

Device Registration Process

The controller and a device perform the processes of making a connection request, PKI-based mutual authentication to shared key creation, shared-key-using mutual authentication to session-related information creation, and registration of the controller and device by performing the process from step S101 to step S107 in the sequence chart in FIG. 12 as in the second embodiment.

However, when the authentication processing unit 204 of the device 200a performs registration in the connecting controller management table 3100 via the device management unit 201 in step S104, information about the group key created in step S103 is registered as the item of the group key (current) 3140 (step S104).

When the device management unit 101 of the controller 100 performs registration in the connecting device management table 3000 in step S106, information about the group key is similarly registered as the item of the group key (current) 3040 (step S106).

Session Update Process

Figure 30:
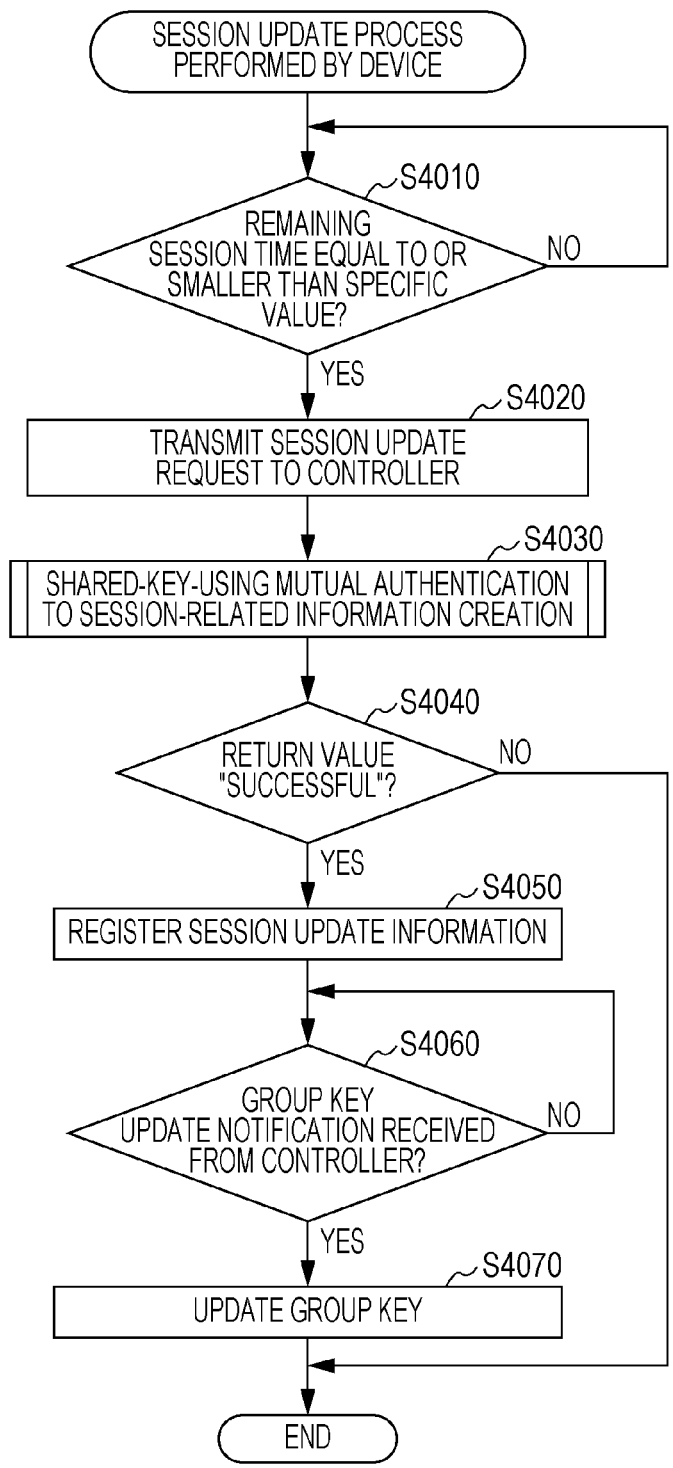
FIG. 30 is a flowchart illustrating an example of a procedure of a session update process performed by the device according to the third embodiment.
Figure 31:
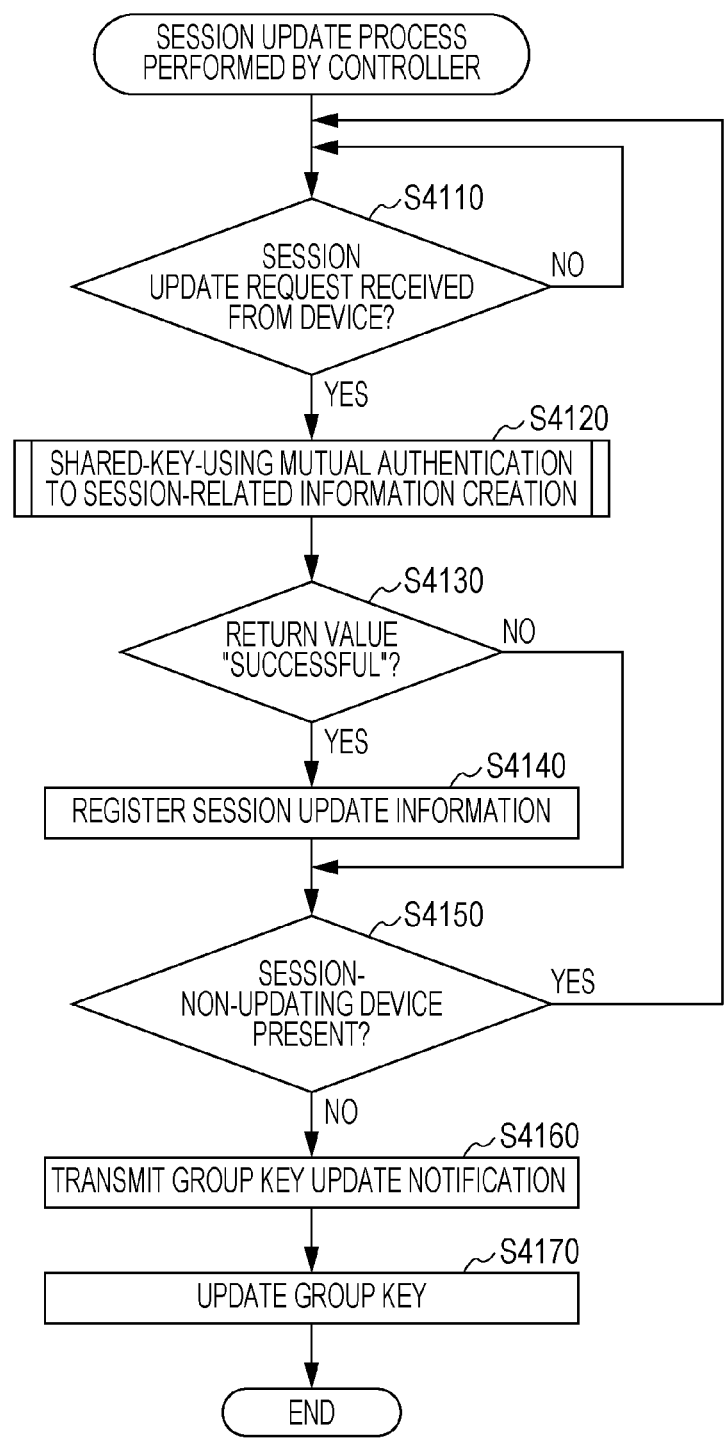
FIG. 31 is a flowchart illustrating an example of a procedure of a session update process performed by the controller according to the third embodiment.
Figure 32:
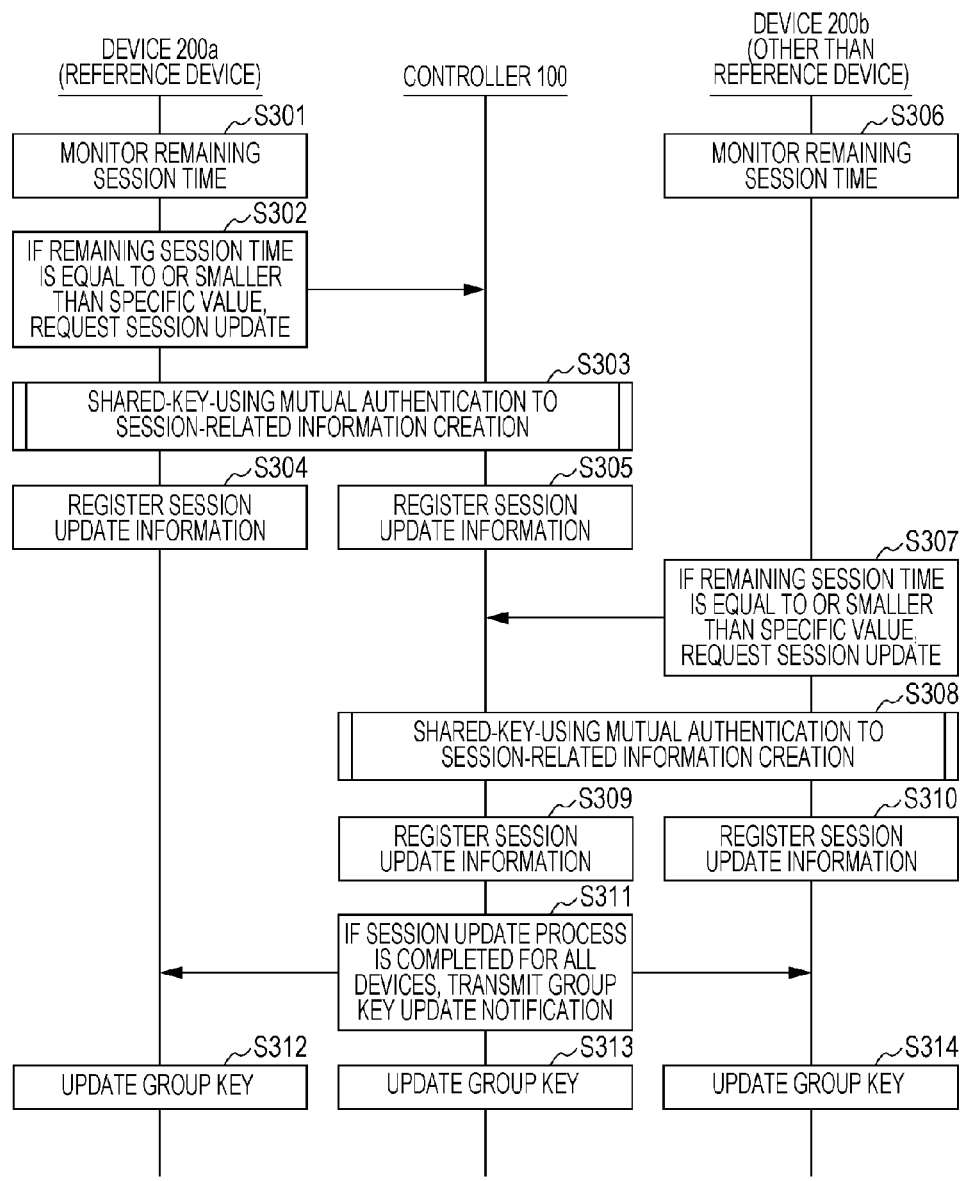
FIG. 32 is a sequence chart illustrating an example of a procedure of a session update process according to the third embodiment.

FIG. 30 and FIG. 31 are flowcharts illustrating examples of procedures of session update processes respectively performed by a device and the controller in this embodiment. FIG. 32 is a sequence chart illustrating an example of a procedure of the session update process that includes interaction between a device and the controller.

The processes respectively performed by a device and the controller are outlined with reference to the flowcharts in FIG. 30 and FIG. 31, and thereafter the process including interaction between a device and the controller is described in detail with reference to the sequence chart in FIG. 32.

First, the session update process performed by a device is outlined with reference to the flowchart in FIG. 30.

A device monitors the remaining session time set with the controller and determines whether the remaining session time is equal to or smaller than a specific value determined in advance (step S4010). If the remaining session time is larger than the specific value (No in step S4010), the device continues monitoring.

If the remaining session time is smaller than the specific value determined in advance (Yes in step S4010), the device transmits a session update request to the controller in order to perform a session update (step S4020).

The device performs the subroutine "shared-key-using mutual authentication to session-related information creation" to thereby perform mutual authentication with the controller using the shared key, thereafter create a group key and a session key, and set the session validity period, the group key, session key, and session validity period being session-related information (step S4030).

If the return value from the subroutine in step S4030 is "successful" (Yes in step S4040), the flow proceeds to step S4050. The device registers the information related to a new session which has been created in step S4030 as session update information (step S4050).

The device waits for a group key update notification from the controller (step S4060). If the device has not received a group key update notification (No in step S4060), the device continues waiting until the device receives a group key update notification.

If the device has received a group key update notification (Yes in step S4060), the device replaces the group key that is currently used with the group key newly created in step S4030 to thereby perform a group key update (step S4070).

On the other hand, if the return value from the subroutine in step S4030 is "error" (No in step S4040), the device does not perform a session update and ends the session update process.

Next, the session update process performed by the controller is outlined with reference to the flowchart in FIG. 31.

The controller waits for a session update request from a device (step S4110). If the controller has not received a session update request (No in step S4110), the controller continues waiting for a session update request from a device.

If the controller has received a session update request from a device (Yes in step S4110), the controller performs the subroutine "shared-key-using mutual authentication to session-related information creation" to thereby perform mutual authentication with the device using the shared key, thereafter create a group key and a session key, and set the session validity period, the group key, session key, and session validity period being session-related information (step S4120).

If the return value from the subroutine in step S4120 is "successful" (Yes in step S4130), the controller registers the information related to a new session which has been created in step S4120 as session update information (step S4140).

On the other hand, if the return value from the subroutine in step S4120 is "error" (No in step S4130), the controller does not perform a session update for the device that is performing a session update.

If another device that has not performed a session update is present (Yes in step S4150), the flow returns to the first step, and the controller waits for a session update request from the device that has not performed a session update (step S4110).

If the session update process has been completed for all devices (No in step S4150), the controller transmits a group key update notification to devices using the same group key (step S4160).

The controller replaces the group key that is currently used with the group key newly created in step S4120 to thereby perform a group key update (step S4170).

Hereinafter, the process including interaction between devices and the controller will be described with reference to the sequence chart in FIG. 32 while differences from the second embodiment are focused. Regarding the devices, it is assumed that the device 200a is the reference device and the device 200b is a device other than the reference device, for example.

In this embodiment, each device requests a session update to the controller in accordance with the remaining session time as in the second embodiment and performs the process of shared-key-using mutual authentication to session-related information creation. The device and the controller each register session update information.

In steps S304 and S310, the device management unit 201 of each device registers the created session key, group key, and session validity period in the connecting controller management table 3100 stored in the device information storage unit 203. At this time, information about the created group key is registered as the item of the group key (new) 3150.

In steps S305 and S309, the device management unit 101 of the controller registers the created session key, group key, and session validity period in the connecting device management table 3000 included in the device information storage unit 102. At this time, information about the created group key is registered as the item of the group key (new) 3050. Regarding the session update state 3080, the value of the session update state 3080 of a device other than the reference device is set to "not updated" as in the above-described embodiments upon a session update with the reference device. Upon a session update with a device other than the reference device, the value of the session update state 3080 of a device other than the reference device is updated to "updated".

The device management unit 101 of the controller 100 refers to the item of the session update state 3080 in the connecting device management table 3000 and checks if a "not updated" device is present. At this time, if a device having the item of the session update state being set to "not updated" is present, the controller waits for a session update request from the device. If a device having the session update state being set to "not updated" is not present, the device management unit 101 of the controller transmits a group key update notification to all devices with which encrypted communication is performed using the same group key (step S311).

When the device management unit 201 of the device has received the group key update notification, the device management unit 201 updates the group key (current) 3140 by overwriting the value of the group key (current) 3140 with the value set in the group key (new) 3150 in the connecting controller management table 3100 and deletes the value set in the group key (new) 3150.

Similarly, the device management unit 101 of the controller 100 updates the group key (current) 3040 by overwriting the value of the group key (current) 3040 with the value set in the group key (new) 3050 in the connecting device management table 3000 and deletes the value set in the group key (new) 3050.

The processes "PKI-based mutual authentication to shared key creation", "shared-key-using mutual authentication to session-related information creation", "device history information transmission process", and "control information transmission process" are similar to those in the second embodiment, and therefore, description thereof will be omitted.

Here, information to be simultaneously transmitted to the devices by the controller is encrypted by using the encryption key that is retained by the controller and the devices as the "group key (current)".

3-4. Conclusion

In the authentication system according to this embodiment, a group key newly created in a session update process performed by the controller and each device is retained in a place other than that of a group key used in encrypted communication. At the time when a session update process is completed by the controller and all devices that are connected to the controller, the controller sends a group key update notification to the devices, and the controller and the devices perform group key switching. As a result, the controller and a plurality of devices can perform a group key update at the same timing, and even if the controller and the devices perform mutual authentication and a group key update, the controller can simultaneously transmit encrypted information to the devices.

4. Modifications

The authentication system using the authentication method according to the present disclosure, which has been described with reference to the embodiments, can be modified as follows. The present disclosure is not limited to the authentication method described in the above embodiments as a matter of course.

(1) In the above embodiments, the controller and the devices are connected to one network. The network may be a home area network or another type of area network.

(2) In the above embodiments, although one group key is set for one controller, a plurality of group keys may be set. In this case, one reference device is set per devices using the same group key.

(3) In the above embodiments, in a case where a connection between the controller and the reference device is lost, the controller extracts another device from the connecting device management table stored in the device information storage unit and sets the device as the reference device. In this case, as the reference device, a device that is always turned on may be specified. For example, a device that is always turned on and operates, such as a refrigerator, may be specified.

(4) In mutual authentication using a shared key in the above embodiments, challenge-response authentication using a shared key and random numbers is performed; however, the authentication scheme to be used is not limited to this. For example, an authentication scheme based on RFC 5191 Protocol for Carrying Authentication for Network Access (PANA) may be used. A general technique of RFC 5191 described in D. Forsberg and four others, RFC 5191, "Protocol for Carrying Authentication for Network Access (PANA)", [online], May 2008, Internet Engineering Task Force, [searched on Jun. 24, 2014], Internet <URL: http://www.rfc-editor.org/rfc/pdfrfc/rfc5191.txt.pdf> is used, and therefore, description of the authentication scheme will be omitted.

In a case of using RFC 5191, authentication may be performed by further using an EAP-PSK. A session key may be derived by using an EMSK that is derived as a result of a negotiation for an EAP-PSK. Further, as a key deriving function used at this time, HMAC#SHA2#256 may be used.

(5) In the above embodiments, the controller creates a group key upon device registration processing and session update processing and delivers the group key to the devices. However, the manner of sharing a group key is not limited to this, and a group key may be shared by performing a key exchange based on ECDH or DH (Diffie-Hellman) between the controller and the reference device.

Each of the controller and the reference device may generate random numbers, encrypt the generated random numbers using the shared key, and transmit the result to the counterpart. The counterpart may decrypt the received encrypted random numbers using the shared key, perform an exclusive-OR operation on the random numbers created by itself and the decrypted random numbers, and use the result as a group key.

Such procedure may be used as a session key creation procedure that is performed by the controller and each device.

(6) The controller according to the present disclosure may be a dedicated device that is used as the controller only, a distribution switchboard installed in a home, a television or another AV device, a home electrical appliance, or the like.

(7) The controller may have a function of displaying the amount of power consumption of a connected device, the amount of power of a storage battery, and the amount of power generated from photovoltaic generation.

(8) A communication scheme used by the controller and the devices according to the present disclosure may be based on Ethernet (registered trademark), Wi-Fi (Wireless Fidelity), specified lower power radio, power line communication, or Bluetooth (registered trademark).

(9) In the first embodiment above, in the session update process, in a case where a device that has not performed a session update is present, a session update notification is transmitted to the device to thereby make the device start a session update. Here, in a case where the device is not turned on, the controller may transmit a session update notification to the device at regular intervals.

(10) In the first embodiment above, in the session update process, in a case where a device that has not performed a session update is present, a session update notification is transmitted to the device to thereby make the device start a session update. Here, in a case where it is determined that the device is unable to start a session update process because the device is performing a process, for example, the device may communicate the delay time of the session update to the controller and perform the session update process after the elapse of the delay time.

(11) In the above embodiments, the validity period of a session is managed by using the remaining session time stored in the connecting device management table or the connecting controller management table. However, the manner of managing the validity period is not limited to this, and the validity period may be managed by using the session start date and time or the session end date and time. For example, in a case of management using the session start date and time, a specific session validity period may be set in advance, a date and time obtained by adding the session validity period to the session start date and time may be compared with the current date and time, and determination as to whether the session is to be updated may be performed. Alternatively, in a case of management using the session end date and time, for example, the current date and time may be compared with the session end date and time, and determination as to whether the session is to be updated may be performed.

(12) In the above embodiments, in the session update process, the device determines the timing of a session update on the basis of the remaining session time and transmits a session update request to the controller to thereby start the session update. However, the manner of starting a session update is not limited to this, and the controller may determine the timing of a session update on the basis of the remaining session time and start the session update.

(13) In the above embodiments, a session key for performing one-to-one encrypted unicast communication is shared between a device and the controller. However, a session key need not be shared, and entire encrypted communication between a device and the controller may be performed by using a group key.

(14) In the above embodiments, in the session update process, both the group key and the session key are updated. However, the session update process is not limited to this, and only the group key or only the session key may be updated upon session update processing.

(15) The controller, the devices, and the server, which are apparatuses related to the authentication system in the above embodiments, may each be constituted by a processor, memory, and so on specifically. To the memory, a computer program is recorded. The processor operates in accordance with the computer program recorded to the memory to thereby enable each apparatus to implement its function. Here, the computer program is constituted by a combination of a plurality of instruction codes indicating instructions given to the computer in order to implement predetermined functions.

(16) Some or all of the constituent elements that constitute each apparatus related to the authentication system in the above embodiments may be constituted by one system LSI (Large Scale Integration circuit). Each of the constituent elements that constitute each apparatus described above may be implemented as one chip, or some or all of the constituent elements may be included in one chip.

Although a system LSI is mentioned here, the system LSI may be called an IC (Integrated Circuit), an LSI, a super LSI, or an ultra LSI depending on the difference in the degree of integration. Further, the technique for circuit integration is not limited to LSI, and circuit integration may be implemented by using a dedicated circuit or a general-purpose processor. An FPGA (Field Programmable Gate Array) that can be programmable after manufacturing the LSI, or a reconfigurable processor for which connections and settings of circuit cells within the LSI can be reconfigurable may be used.

In a case where a technique for circuit integration that replaces LSI emerges with the advancement of semiconductor technology or on the basis of any technology that is separately derived, the functional blocks may be integrated by using the technique as a matter of course. Application of biotechnology is possible, for example.

(17) Some or all of the constituent elements that constitute each apparatus related to the authentication system in the above embodiments may be formed of an IC card or a standalone module that can be attached to and detached from the apparatus. The IC card or the module may be tamper-resistant.

(18) The present disclosure may be the method described above. The present disclosure may be a computer program that causes a computer to implement the method or may be a digital signal that includes the computer program. The computer program may be stored in a memory and executed by a processor.

The present disclosure may be a computer-readable recording medium, such as a flexible disk, a hard disk, a CD-ROM, an MO, a DVD, a DVD-ROM, a DVD-RAM, a BD (Blu-ray (registered trade mark) Disc), or a semiconductor memory, for example, to which the computer program or the digital signal is recorded. The present disclosure may be the digital signal that is recorded to such a recording medium.

The present disclosure may be the computer program or the digital signal that is transmitted via a telecommunication line, a wireless or wired communication line, a network, typically, the Internet, data broadcasting, or the like.

The present disclosure may be a computer system that includes a processor and a memory, in which the computer program may be recorded to the memory and the processor may operate in accordance with the computer program.

The present disclosure may be implemented as another independent computer system by transferring the computer program or the digital signal, which is recorded to the recording medium, or by transferring the computer program or the digital signal via the network or the like.

(19) The present disclosure may be implemented by partially combining the above-described embodiments or modifications.

5. Supplementary Notes

Hereinafter, one embodiment of the authentication method related to the present disclosure and effects thereof will be further described.

(a) An authentication method according to the present disclosure is an authentication method performed in an authentication system including a controller, a first device, and a second device. The authentication method includes: a first step comprising: performing mutual authentication between the controller and the first device, creating a group key, sharing the group key between the controller and the first device, and setting the first device as a reference device; a second step comprising: performing mutual authentication between the controller and the second device, and sharing the group key with the second device; a third step performed after the second step comprising: performing mutual authentication between the controller and the first device, updating the group key, and sharing the updated group key between the controller and the first device; and a fourth step performed at a group key update timing when the group key is updated comprising: performing mutual authentication between the controller and the second device, and sharing the updated group key with the second device also.

Accordingly, a device among the devices connected to the controller is set as a reference device, and devices other than the reference device perform a group key update at the timing of a group key update by the reference device to thereby enable a plurality of devices to perform a group key update at the same timing. Even if the controller and the devices perform mutual authentication and a group key update, the controller can simultaneously transmit encrypted information to the devices.

(b) In the authentication method according to (a) above, the controller, the first device, and the second device may be connected to one home area network.

Accordingly, the controller and the devices that are connected to a home area network can perform a group key update at the same timing. Even if the controller and the devices perform mutual authentication and a group key update, the controller can simultaneously transmit encrypted information to the devices.

(c) The authentication method according to (a) above may further include transmitting, when the group key is updated, a group key update notification to the second device. The group key update timing may be a timing when the second device receives the group key update notification.

Accordingly, after a group key update by the controller and the reference device, a device that does not share the updated group key receives a group key update notification from the controller and updates the group key to thereby enable a plurality of devices connected to the controller to perform a group key update at the same timing.

(d) In the authentication method according to (a) above, the first step further include setting a first session period between the controller and the first device; the second step further include setting, between the controller and the second device, a second session period that is based on the first session period and on a period elapsed from a time point of setting the first session period; the third step may be started in accordance with the first session period and the period elapsed from the time point of setting the first session period; and the group key update timing may be a timing that is based on the second session period and a period elapsed from a time point of setting the second session period.

Accordingly, the session period for the controller and a device other than the reference device is set on the basis of the remaining session period for the controller and the reference device, and the controller and each device connected to the controller perform a group key update on the basis of the session period to thereby enable a plurality of devices connected to the controller to perform a group key update at the same timing.

(e) In the authentication method according to (a) above, the controller may own a private key and a public key certificate of the controller; the first device may own a private key and a public key certificate of the first device; the authentication method may further include creating a first shared key and sharing the first shard key between the controller and the first device; the mutual authentication performed in the first step may be public key authentication in which mutual authentication is performed by using the public key certificate owned by the controller and the public key certificate owned by the first device in accordance with a public key infrastructure; and the mutual authentication performed in the third step may be shared key authentication in which mutual authentication is performed by using the first shared key.

Here, in a case of making a connection between the controller and a device, for example, mutual authentication using a public key certificate based on a PKI is performed. In a case of subsequent session update processing, mutual authentication using a shared key is performed. In general, mutual authentication using a shared key involves a lower processing load compared to mutual authentication based on a PKI. Accordingly, by employing a procedure using a shared key, a processing load related to mutual authentication can be reduced.

(f) In the authentication method according to (e) above, in the creating and sharing of the first shared key, the first shared key may be shared through a key exchange; and the shared key authentication may be challenge-response authentication in which random numbers and the first shared key are used.

Accordingly, the controller and a device can mutually confirm their validity by performing challenge-response authentication using a shared key and random numbers.

(g) In the authentication method according to (e) above, the second device may own a private key and a public key certificate of the second device; the authentication method may further include creating a second shared key and sharing the second shared key between the controller and the second device; the mutual authentication performed in the second step may be public key authentication in which mutual authentication is performed by using the public key certificate owned by the controller and the public key certificate owned by the second device in accordance with a public key infrastructure; and the mutual authentication performed in the fourth step may be shared key authentication in which mutual authentication is performed by using the second shared key.

Accordingly, the controller combines and performs two types of procedures, namely, mutual authentication based on a PKI and mutual authentication using a shared key with devices connected to the controller to thereby reduce a processing load related to mutual authentication.

(h) An authentication system according to the present disclosure is an authentication system including a controller, a first device, and a second device. The authentication system includes: a first mutual authenticator that performs mutual authentication between the controller and the first device, creates a group key, shares the group key between the controller and the first device, and sets the first device as a reference device; a second mutual authenticator that performs mutual authentication between the controller and the second device, and shares the group key with the second device; a third mutual authenticator that performs mutual authentication between the controller and the first device, updates the group key, and shares the updated group key between the controller and the first device; and a fourth mutual authenticator that, at a group key update timing when the group key is updated, updates the group key, performs mutual authentication between the controller and the second device, and shares the updated group key with the second device.

Accordingly, a device among the devices connected to the controller is set as a reference device, and devices other than the reference device perform a group key update at the timing of a group key update by the reference device to thereby enable a plurality of devices to perform a group key update at the same timing. Even if the controller and the devices perform mutual authentication and a group key update, the controller can simultaneously transmit encrypted information to the devices.

The authentication method according to the present disclosure can be used in a network system in which a controller simultaneously transmits information encrypted using a group key to a plurality of connected devices for mutual authentication, a group key update, and the like performed by the controller and the devices.

What is claimed is:

1. An authentication method performed in an authentication system including a controller, a first device, and a second device, the authentication method comprising:
   a first process comprising: performing a first mutual authentication between the controller and the first device, creating a group key, sharing the group key between the controller and the first device, and setting the first device as a reference device;
   a second process comprising: performing a first mutual authentication between the controller and the second device, and sharing the group key with the second device;
   a third process performed after the second process comprising: performing a second mutual authentication between the controller and the first device in response to a session update request from the first device, updating the group key in response to the second mutual authentication between the controller and the first device, and sharing the updated group key between the controller and the first device; and
   a fourth process performed at a group key update timing when the group key is updated comprising: performing a second mutual authentication between the controller and the second device, and sharing the updated group key with the second device.

2. The authentication method according to claim 1, wherein
   the controller, the first device, and the second device are connected to one home area network.

3. The authentication method according to claim 1, further comprising:
   transmitting, when the group key is updated, a group key update notification to the second device, wherein
   the group key update timing is a timing when the second device receives the group key update notification.

4. The authentication method according to claim 1, wherein
   the first process further includes setting a first session period between the controller and the first device,
   the second process further includes setting, between the controller and the second device, a second session period that is based on the first session period and on a period elapsed from a time point of setting the first session period, the third process is started in accordance with the first session period and the period elapsed from the time point of setting the first session period, and the group key update timing is a timing that is based on the second session period and a period elapsed from a time point of setting the second session period.

5. The authentication method according to claim 1, wherein the controller owns a private key and a public key certificate of the controller, the first device owns a private key and a public key certificate of the first device, the authentication method further comprises creating a first shared key and sharing the first shared key between the controller and the first device, the first mutual authentication performed in the first process is public key authentication which is performed by using the public key certificate owned by the controller and the public key certificate owned by the first device in accordance with a public key infrastructure, and the second mutual authentication performed in the third process is shared key authentication which is performed by using the first shared key.

6. The authentication method according to claim 5, wherein in the creating and sharing of the first shared key, the first shared key is shared through a key exchange, and the shared key authentication is challenge-response authentication in which random numbers and the first shared key are used.

7. The authentication method according to claim 5, wherein the second device owns a private key and a public key certificate of the second device, the authentication method further comprises creating a second shared key and sharing the second shared key between the controller and the second device, the first mutual authentication performed in the second process is public key authentication which is performed by using the public key certificate owned by the controller and the public key certificate owned by the second device in accordance with a public key infrastructure, and the second mutual authentication performed in the fourth process is shared key authentication which is performed by using the second shared key.

8. An authentication system, comprising:
a controller;
a first device; and
a second device,
wherein the controller and the first device are configured to perform a first mutual authentication, with the first device being set as a reference device and a group key being created and shared between the controller and the first device in response to the first mutual authentication between controller and the first device, the controller and the second device are configured to perform a first mutual authentication, with the group key being shared with the second device in response to the first mutual authentication between controller and the second device, after the first mutual authentication between controller and the second device: the controller and the first device are configured to perform a second mutual authentication in response to a session update request from the first device, with the group key being updated and shared between the controller and the first device in response to the second mutual authentication between the controller and the first device, and at a group key update timing when the group key is updated, the controller and the second device are configured to perform a second mutual authentication, with the updated group key being shared with the second device.

9. The authentication method according to claim 1, wherein the third process, in which the second mutual authentication is performed between the controller and the first device in response to the session update request from the first device, is performed after the first device receives a session update notification from the controller.

10. The authentication method according to claim 1, wherein the group key created during the first process is associated with a remaining session time, and the first device monitors the remaining session time to determine whether to transmit the session update request to the controller in order to perform a session update.

11. The authentication method according to claim 10, wherein a new session is created between the controller and the first device in response to the session update, during which the group key is updated and the updated group key is shared between the controller and the first device.

12. The authentication method according to claim 1, wherein the group key created during the first process is associated with a remaining session time, the group key shared with the second device during the second process is associated with a session period set based on the remaining session time for the controller and the first device.

13. The authentication method according to claim 1, wherein the group key is an encryption key used by the controller for simultaneously transmitting same information to the first device and the second device.

14. The authentication method according to claim 1, wherein after the third process and before the fourth process, the controller transmits a session update notification to the second device which notifies that a session update has not been performed.

15. The authentication method according to claim 1, wherein after the third process and before the fourth process, the controller simultaneously transmits a session update notification to a plurality of devices, including the second device, which notifies that a session update has not been performed.

16. The authentication method according to claim 1, wherein after the third process and before the fourth process, the controller simultaneously transmits a session update notification to a plurality of devices, with the plurality of devices being determined as not having performed a session update.

17. The authentication method according to claim 1, wherein
the first mutual authentication between the controller and the first device includes a different process than the second mutual authentication between the controller and the first device.

18. The authentication method according to claim 1, wherein
the first process includes a device registration process in which the first device and the controller register each other after the first mutual authentication between the controller and the first device.

\* \* \* \* \*